United States Patent
Luthra et al.

(10) Patent No.: US 10,625,952 B1
(45) Date of Patent: Apr. 21, 2020

(54) INDUCTION STATION FOR CONVEYING PACKAGES IN STORAGE FACILITY

(71) Applicant: GREY ORANGE PTE. LTD., Singapore (SG)

(72) Inventors: Kishore Kumar Luthra, Gurugram (IN); Gnanaprakash Muthusamy, Coimbator (IN); Mohit Kumar, Meerut (IN); Abhinav Roy, Begusarai (IN); Ananya Agnihotri, Kanpur (IN); Amitabh Nauharia, Chandigarh (IN)

(73) Assignee: GREY ORANGE PTE. LTD., Singapore (SG)

( * ) Notice: Subject to any disclaimer, the term of this patent is extended or adjusted under 35 U.S.C. 154(b) by 0 days.

(21) Appl. No.: 16/657,745

(22) Filed: Oct. 18, 2019

(51) Int. Cl.
| | |
|---|---|
| *B65G 47/50* | (2006.01) |
| *B07C 5/10* | (2006.01) |
| *B07C 5/16* | (2006.01) |
| *B07C 5/36* | (2006.01) |
| *B65G 37/00* | (2006.01) |
| *B65G 43/08* | (2006.01) |

(52) U.S. Cl.
CPC .............. *B65G 47/503* (2013.01); *B07C 5/10* (2013.01); *B07C 5/16* (2013.01); *B07C 5/36* (2013.01); *B65G 37/005* (2013.01); *B65G 43/08* (2013.01); *B65G 2203/0233* (2013.01); *B65G 2203/0258* (2013.01); *B65G 2203/0291* (2013.01); *B65G 2203/044* (2013.01)

(58) Field of Classification Search
CPC .... B65G 27/005; B65G 43/08; B65G 47/503; B07C 5/10; B07C 5/16; B07C 5/36
USPC .................. 198/349, 358, 448, 502.2, 502.3; 700/213, 214, 217, 229, 230
See application file for complete search history.

(56) References Cited

U.S. PATENT DOCUMENTS

| | | | | |
|---|---|---|---|---|
| 5,484,049 A | * | 1/1996 | Huang | B65G 43/08 198/460.3 |
| 6,209,711 B1 | * | 4/2001 | Koopmann | B65G 43/08 198/502.2 |
| 6,466,828 B1 | * | 10/2002 | Lem | G05B 19/0421 198/349 |
| 6,484,066 B1 | * | 11/2002 | Riess | G01B 11/00 198/502.2 |
| 6,847,859 B2 | * | 1/2005 | Nuebling | G01B 11/04 198/502.2 |

(Continued)

*Primary Examiner* — Douglas A Hess
(74) *Attorney, Agent, or Firm* — Oblon, McClelland, Maier & Neustadt, L.L.P.

(57) ABSTRACT

An induction station for conveying packages in a storage facility is provided. The induction station includes a plurality of parallel feed conveyors including at least first and second conveyors, and one or more buffer conveyors including at least a third conveyor for conveying the packages from the first and second conveyors to the third conveyor. The induction station further includes sensors for measuring a height, a weight, a length, and a width of each package. The induction station further includes sensors for detecting each package as one of a first package type or a second package type. The induction station further includes a controller to control a first, a second speed, and a third speed of the first through third conveyors, respectively, based on the detected package type of each package and at least one of the weight, height, length, and width of each package.

20 Claims, 17 Drawing Sheets

(56) References Cited

U.S. PATENT DOCUMENTS

| | | | | |
|---|---|---|---|---|
| 6,934,605 B1 * | 8/2005 | Dothan | G05B 19/41815 141/6 |
| 7,579,582 B2 * | 8/2009 | Kaltenbach | G06K 7/10722 235/462.06 |
| 7,586,049 B2 * | 9/2009 | Wurz | G01B 11/04 177/145 |
| 7,632,367 B2 * | 12/2009 | Smith | B65C 1/02 156/64 |
| 7,725,213 B2 * | 5/2010 | Hysell | B65G 47/844 700/229 |
| 7,979,830 B2 * | 7/2011 | Katsuzawa | G06F 17/5077 716/122 |
| 8,060,243 B2 * | 11/2011 | Ogawa | B65G 43/08 198/358 |
| 8,627,946 B2 * | 1/2014 | Baitz | G07G 1/0045 198/502.1 |
| 8,841,603 B1 * | 9/2014 | Blanton | G01B 11/2518 250/256 |
| 9,004,271 B2 * | 4/2015 | Fourney | G01G 11/003 198/502.2 |
| 9,079,721 B2 * | 7/2015 | Kawanishi | G01G 13/16 |
| 9,201,163 B2 * | 12/2015 | Vegh | B65G 43/00 |
| 9,325,888 B2 * | 4/2016 | Hoffmann | H04N 5/2256 |
| 9,352,872 B2 * | 5/2016 | Wojdyla | B65C 1/021 |
| 9,399,557 B1 * | 7/2016 | Mishra | B65G 43/00 |
| 9,400,342 B2 * | 7/2016 | Hotta | G01V 8/20 |
| 9,476,757 B2 * | 10/2016 | Kleczewski | G01G 19/035 |
| 9,604,258 B2 * | 3/2017 | Layne | B07C 5/36 |
| 9,880,269 B2 * | 1/2018 | Sorensen | G01G 19/083 |
| 9,996,805 B1 * | 6/2018 | Lisso | G06Q 10/043 |
| 10,173,573 B2 * | 1/2019 | Jones | B60P 1/38 |
| 10,369,701 B1 * | 8/2019 | Diankov | B25J 13/085 |
| 10,399,793 B2 * | 9/2019 | Andreoli | B65G 43/04 |

* cited by examiner

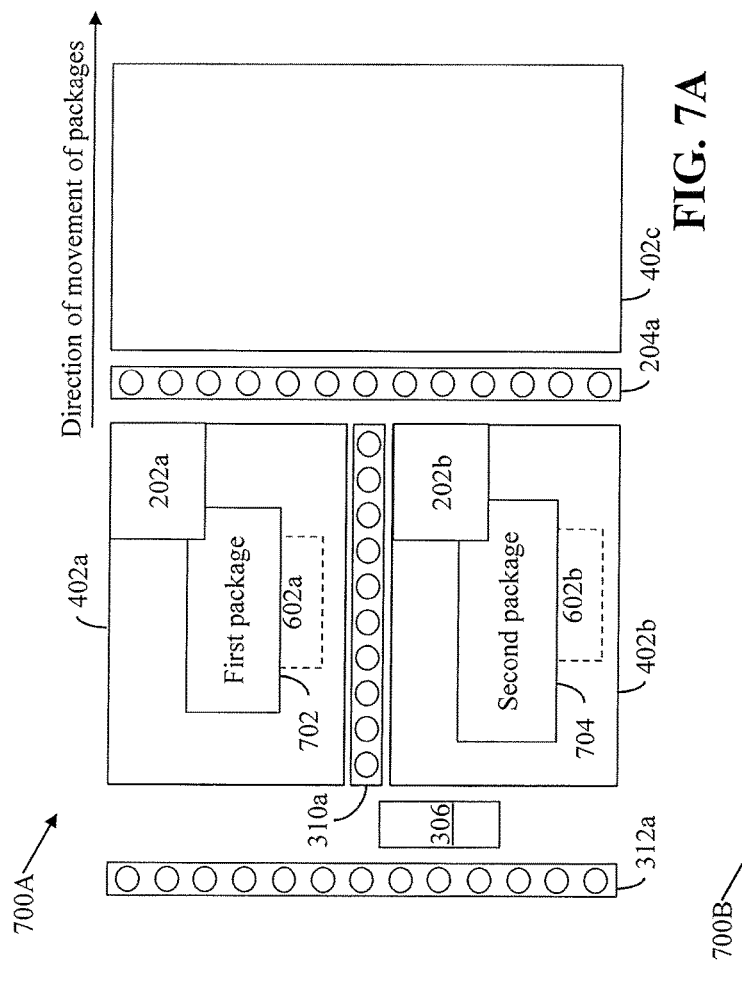
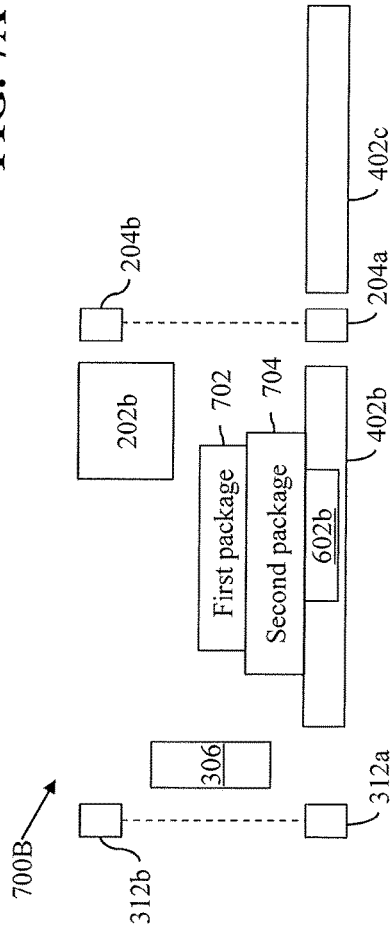

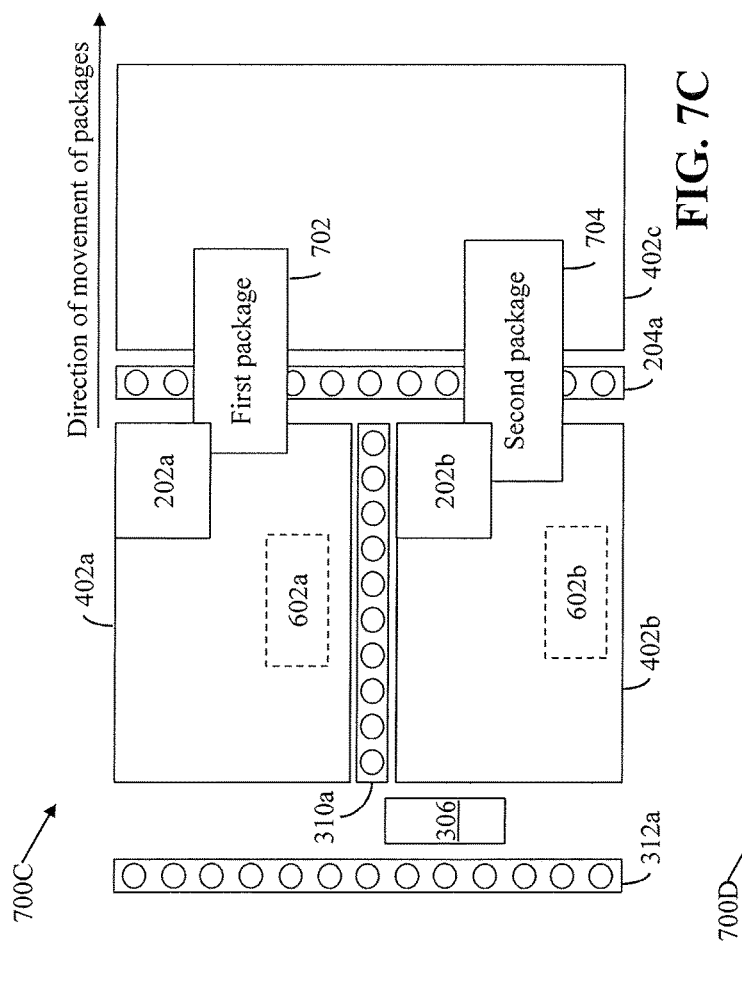
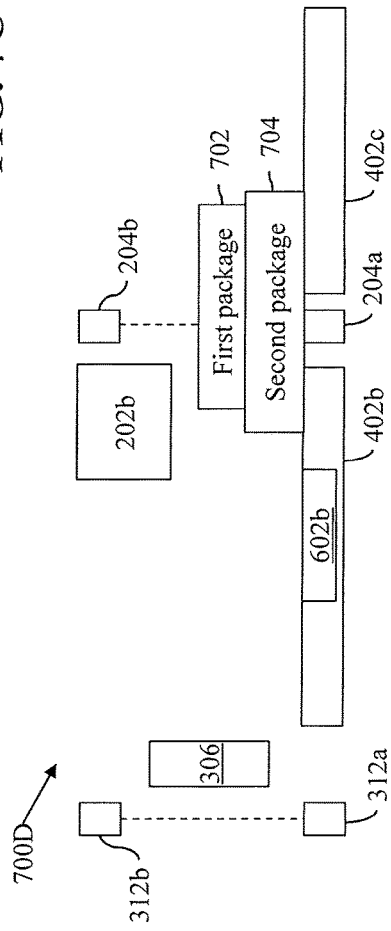
FIG. 7C
FIG. 7D

INDUCTION STATION FOR CONVEYING PACKAGES IN STORAGE FACILITY

FIELD OF THE DISCLOSURE

The present disclosure relates generally to management of storage facilities, and, more particularly to an induction station in a storage facility for conveying packages.

BACKGROUND

Modern storage facilities or warehouses handle a large number of packages or inventory items on a daily basis. These storage facilities may employ automated induction stations (e.g., automated sortation systems) for inducting packages in and out of a storage facility. Such induction stations also cater to various other requirements at the storage facility such as, but not limited to, sortation of the packages, distribution of the packages between different types of automated facilities in the storage facility, or the like. Therefore, efficient and quick induction of the packages is essential in streamlining operations at the storage facility and improving an efficiency or throughput of the storage facility. Consequently, a throughput of the induction station influences the throughput of the storage facility. A low throughput of the induction station can serve as a bottleneck to the operations at the storage facility, causing a dip in the efficiency of the storage facility and resulting in sub-optimal returns for an entity associated with the storage facility that may not be desirable.

Induction stations are typically designed to handle only one package at a time. Each induction station is further designed to handle a specific type of package at a time. For example, a first type of induction station is designed to handle small packages, which cannot handle large packages. Further, a second type of induction station is designed to handle large packages as well as small packages (one at a time), but leads to underutilization of the second type of induction station. Using different types of induction stations (e.g., the first and second types of induction stations) for handling different types of packages (e.g., the small and large packages) may be capital intensive, inefficient, and time consuming. Further, the conventional induction stations may not be accurate for measuring various dimensional parameters associated with each package. For example, the conventional induction stations use laser-based dimensioning systems or vision-based dimensioning systems for measuring the various dimensional parameters. The laser-based dimensioning systems are expensive, while the vision-based dimensioning systems are less accurate than the laser-based dimensioning systems. So, there exists a tradeoff between price and accuracy. In light of the foregoing, there exists a need for an efficient and effective induction station that is capable of handling small and large packages, and is cost effective while offering a high degree of accuracy.

SUMMARY

In an embodiment of the present disclosure, an induction station for conveying one or more packages in a storage facility is provided. The induction station includes first, second, and third conveyors. The first and second conveyors are used for conveying the one or more packages from the first and second conveyors to the third conveyor. The first and second conveyors are in parallel. The induction station further includes a first set of sensors for measuring a weight, a height, a length, and a width of each package. The induction station further includes a second set of sensors for detecting a package type of each package as one of a first package type or a second package type. The second set of sensors is installed in a first gap between the first and second conveyors. The induction station further includes a controller configured to control a first speed of the first conveyor, a second speed of the second conveyor, and a third speed of the third conveyor for conveying the one or more packages. The first speed, the second speed, and the third speed are controlled based on the detected package type of each package and at least one of the weight, height, length, and width of each package.

In another embodiment of the present disclosure, a dimensioning system for an induction station in a storage facility is provided. The dimensioning system includes a first set of sensors configured to collect first sensor data for dynamically measuring a height of each package of one or more packages and a second set of sensors configured to collect second sensor data for dynamically measuring a length and a width of each package. Each package is placed on at least one of first and second conveyors of the induction station and is moving from at least one of the first and second conveyors to a third conveyor of the induction station. A controller of the induction station dynamically determines the height of each package based on the first sensor data collected by the first set of sensors, and the length and width of each package based on the second sensor data collected by the second set of sensors.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements:

FIGS. 7A and 7B are block diagrams that illustrate top and side views, respectively, of the induction station at a first time instance 't=$t_0$', in accordance with an embodiment of the present disclosure;

FIGS. 7C and 7D are block diagrams that illustrate top and side views, respectively, of the induction station at a second time instance 't=$t_1$', in accordance with an embodiment of the present disclosure;

Figure 1:
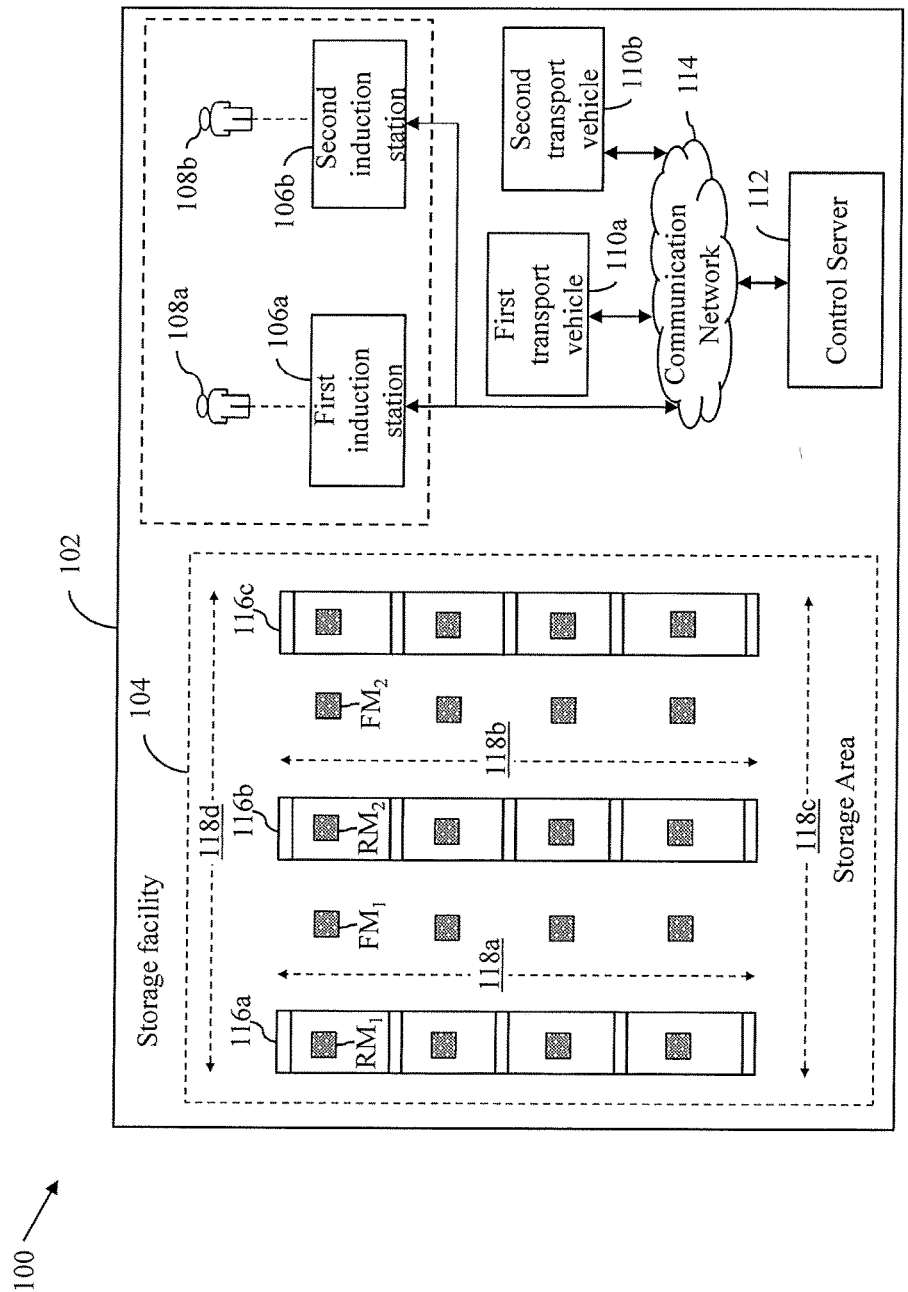
FIG. 1 is a block diagram that illustrates an exemplary environment, in accordance with an embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Embodiments of the present disclosure provides an induction station for conveying one or more packages (hereinafter, 'the packages') in a storage facility. Examples of the storage facility may include a warehouse, a retail store, a package processing facility, a sorting facility, or any combination thereof. The induction station includes a plurality of feed conveyors (e.g., first and second conveyors) and one or more buffer conveyors (e.g., the third conveyor). The plurality of feed conveyors are used for conveying the packages from the plurality of feed conveyors to the one or more buffer conveyors. For example, the first and second conveyors are used for conveying the packages from the first and second conveyors to the third conveyor. The plurality of feed conveyors (e.g., the first and second conveyors) may be in parallel. In some embodiments, the induction station further includes a first set of sensors (e.g., ultrasonic sensors, light array sensors, weight sensors, or the like) for measuring a height, a height, a length, a width, and a weight of each package of the packages and a position of each package on at least one of the first and second conveyors. The controller may determine a height, a length, a width, a position, and a weight of each package, based on sensor data from the first set of sensors. The induction station may further include a second set of sensors for detecting whether each package is one of a first package type or a second package type. Each package of the first package type, when placed on one of the first and second conveyors, is within boundaries of a corresponding conveyor (e.g., package is aligned on conveyor such that the package does not fall off as the conveyor transports the package). Each package of the second package type, when placed on one of the first and second conveyors, occupies first and second portions of the first and second conveyors. The induction station may further include a controller configured to control a first speed, a second speed, a third speed of the first, second, and third conveyors, respectively. The first speed, second speed, and the third speed may be controlled based on the detected package type of each package and at least one of the weight, height, length, and width of each package. The controller may be further configured to communicate with a control server over a communication network. The controller may communicate the height, the weight, the length, the width and an identification code of each package to the control server. In some embodiments, the control server selects one or more transport vehicles, from a set of transport vehicles, for transporting each package from the third conveyor to a location corresponding to each package. The control server may select the one or more transport vehicles based on package details of each package and at least one of the weight, height, length, and width of each package.

Embodiments of the present disclosure disclose a dimensioning system for an induction station in a storage facility. The dimensioning system may include a first set of sensors configured to collect first sensor data for dynamically measuring a height of each package of one or more packages (hereinafter, 'the packages'). The dimensioning system may further include a second set of sensors for collecting second sensor data for dynamically measuring a length and a width of each package. Each package is placed on at least one of a plurality of feed conveyors (e.g., first and second conveyors) of the induction station to one or more buffer conveyors (e.g., a third conveyor) of the induction station and is moving from at the least one of the plurality of feed conveyors to at least one of the one or more buffer conveyors. In some embodiments, a controller of the induction station determines the height of each package based on the first sensor data collected by the first set of sensors, and the length and width of each package based on the second sensor data collected by the second set of sensors. The induction station may include a third set of sensors for detecting a package type of each package as one of a first package type or a second package type. The controller may determine a weight of each package based on sensor data collected by a fourth set of sensors of the induction station.

In some embodiments, the fourth set of sensors includes one or more weight sensors and each weight sensor. The first and second conveyors may be configured to convey two packages of the first package type, simultaneously, or a single package of the second package type. The second set of sensors may further be configured to measure a position of each package on at least one of the first and second conveyors. In some embodiments, the controller controls a first speed of the first conveyor, a second speed of the second conveyor, and a third speed of the third conveyor for conveying the packages. The first speed, the second speed, and the third speed may be controlled based on the package type of each package and at least one of the height, length, width, and weight of each package. The controller may communicate with a control server over a communication network. The control server may select one or more transport vehicles, from a set of transport vehicles, for transporting each package from the third conveyor to a first location associated with each package. The one or more transport vehicles may be selected based on at least one of the package details of each package and at least one of the height, the length, the width, and the weight of each package.

In some embodiments, "Induction station" may be a material handling system used for handling and managing packages or inventory items in a storage facility such as a warehouse, a retail store, a sorting facility, a package processing facility, or a combination thereof. In one example, the induction station may be a stand-alone entity. In another example, the induction station may be an entity that constitutes a part of a supply chain system. For example, the induction station may include a plurality of parallel feed conveyors and a buffer conveyor. The induction station may be operable for conveying packages from at least one of the plurality of feed conveyors to the buffer conveyor. The induction station may further include a set of sensors (such as one or more ultrasonic sensors, light array sensors, or weight sensors) for measuring one or more parameters (such as a height, a weight, a length, or a width) associated with each package.

In some embodiments, "Package" may be an inventory item (e.g., an apparel, an electronic device, a grocery item, or the like) or a container (e.g., a cardboard container) including one or more inventory items.

In some embodiments, "Package type" of a package may indicate a category of the package, determined based on at least a size (i.e., a length, a width, a height, or any combination thereof) of the package. One or more package types may include a first package type (i.e., a small sized package), a second package type (i.e., a medium sized package), or a third package type (i.e., a large sized package).

In some embodiments, "Transport vehicle" may be a robotic vehicle (such as an automated guided vehicle, AGV) that executes one or more operations in a storage facility, such as transporting packages from one location to another location in the storage facility. For example, a first transport vehicle may transport a package from an induction station in the storage facility to a first location in the storage facility.

In some embodiments, "Storage facility" may be a warehouse or retail store that includes one or more inventory storage units (such as mobile storage units) for storing one or more inventory items or packages. The storage facility may also be a sorting facility for sorting packages, a package processing facility for processing packages, or the like. The storage facility may further include one or more aisles for transport vehicles to move in the storage facility.

FIG. 1 is a block diagram that illustrates an exemplary environment 100, in accordance with an embodiment of the present disclosure. The environment 100 shows a storage facility 102. The storage facility 102 includes a storage area 104, first and second induction stations 106a and 106b (hereinafter, the first and second induction stations 106a and 106b are referred to as 'the induction stations 106'), first and second operators 108a and 108b (hereinafter, the first and second operators 108a and 108b are referred to as 'the operators 108'), first and second transport vehicles 110 and 110b (hereinafter, the first and second transport vehicles 110a and 110b are referred to as 'the transport vehicles 110'), and a control server (CS) 112. The CS 112 communicates with the induction stations 106 and the transport vehicles 110 by way of a communication network 114 or via separate communication networks established therebetween.

The storage facility 102 may store one or more inventory items or one or more packages (including the one or more inventory items) for fulfillment and/or selling. Hereinafter, the one or more inventory items or one or more packages have been referred to as the inventory items or the packages. Examples of the storage facility 102 may include, but are not limited to, a warehouse, a fulfilment center, or a retail store (e.g., a supermarket, an apparel store, or the like). Examples of inventory items may include, but are not limited to, groceries, apparels, electronic goods, mechanical goods, or the like. The inventory items or packages may be stored in the storage area 104. The storage area 104 may be of any shape, for example, a rectangular shape. The storage area 104 may include one or more inventory storage units (ISU) such as first through third ISUs 116a-116c for storing the inventory items or packages. Hereinafter, the first through third ISUs 116a-116c are collectively referred to as 'the ISUs 116'. Each ISU 116 may have a capacity to store multiple inventory items or packages. The storage units may be one or more bins that are vertically stacked or horizontally concatenated to each other.

The ISUs 116 may be arranged such that first through fourth aisles 118a-118d (hereinafter, the first through fourth aisles 118a-118d are collectively referred to as 'the aisles 118') are formed therebetween. The first aisle 118a may be formed between the first and second ISUs 116a and 116b. The second aisle 118b may be formed between the second and third ISUs 116b and 116c. The third and fourth aisles 118c and 118d may be formed between side faces of the ISUs 116 and sidewalls of the storage area 104. The aisles 118 are passageways used by customers or the transport vehicles 110 to move in the storage area 104. Arrangement of the ISUs 116 is a standard practice and will be apparent to those of skill in the art. In a non-limiting example, it is assumed that the ISUs 116 are arranged such that a layout of the aisles 118 forms a virtual grid in a rectangular space. Thus, each aisle 118 is one of a horizontal aisle or a vertical aisle. For example, the first aisle 118a is a vertical aisle and the fourth aisle 118d is a horizontal aisle. An intersection between horizontal and vertical aisles forms a cross-aisle.

The storage facility 102 may be marked with various fiducial markers (such as fiducial markers $FM_1$, $FM_2$, $RM_1$, and $RM_2$). For the sake of simplicity, the storage area 104 has been shown to include multiple fiducial markers and only the fiducial markers $FM_1$, $FM_2$, $RM_1$, and $RM_2$ have been labelled. It will be apparent to those of skill in the art that the entire storage facility 102 may include the fiducial markers without deviating from the scope of the disclosure. Each fiducial marker may correspond to one of two types— location markers (such as the fiducial markers $FM_1$ and $FM_2$) and ISU markers (such as the fiducial markers $RM_1$ and $RM_2$). The location markers (such as the fiducial markers $FM_1$ and $FM_2$) are located at pre-determined locations in the storage facility 102. The pre-determined locations may not conform to any specific pattern and may be subject to a configuration of the storage facility 102. For example, the fiducial markers $FM_1$ and $FM_2$ are located at first and second locations (for example, on the floor of the storage area 104) along the first and second aisles 118a and 118b, respectively. The ISU markers (such as the fiducial markers $RM_1$ and $RM_2$) may uniquely identify each ISU 116. Examples of the fiducial markers include, but are not limited to, barcodes, quick response (QR) codes, radio frequency identification device (RFID) tags, or the like. In one embodiment, a placement of the fiducial markers may be uniform (i.e., a distance between consecutive fiducial markers is constant). In another embodiment, the placement of the fiducial markers may be non-uniform (i.e., a distance between consecutive fiducial markers is variable).

The first induction station 106a may be a material handling system for handling and managing the packages at the storage facility 102. In an exemplary scenario, the packages may be fed to the first induction station 106a. The first induction station 106a may determine, using various sensors, dimensions (e.g., a length, a width, or a height) of each of the packages. The packages may be fed to the first induction station 106a by one or more operators (e.g., the first operator 108a). Further, the first induction station 106a may determine a weight of each package and identify package details of each package by way of various sensors. The first induction station 106a may further include various sub-systems for facilitating sortation of the packages. In a non-limiting example, the first induction station 106a may include a first conveying sub-system, a first dimensioning sub-system, a first weighing sub-system, and a first package identification sub-system for facilitating the sortation of the packages. Embodiments of the first conveying sub-system, the first dimensioning sub-system, the first weighing sub-system, and the first package identification sub-system are disclosed in detail in conjunction with FIGS. 2 and 3.

In an exemplary embodiment, the first induction station 106a may include a plurality of feed conveyors (for example, first and second conveyors) and one or more buffer conveyors (for example, a third conveyor). The first induction station 106a may be utilized for conveying the packages from at least one of the first and second conveyors to the third conveyor. The first, second, and third conveyors may constitute the first conveying sub-system. The plurality of feed conveyors, such as the first and second conveyors, may be parallel to each other. In an exemplary embodiment, the first induction station 106a may further include a first set of sensors (e.g., ultrasonic sensors, light array sensors, or the like) for measuring dimensions (such as a length, a width, or a height) of each package. The first set of sensors may constitute the first dimensioning sub-system.

In an exemplary embodiment, the first induction station 106a may further include a second set of sensors for detecting whether each package is of a first package type or a second package type. In an exemplary scenario, the second set of sensors may be a set of light array sensors and may be installed in a gap between the first and second conveyors. The second set of sensors may be used to detect a package type of each package (e.g., detect whether each package is of the first package type or the second package type). For example, if a first package is of the first package type, the first package may be a small package. In another example, if a second package is of the second package type, the second package may be a large package. A small package may be a package that when placed on one of the first and second conveyors, does not protrude laterally out of the corresponding conveyor (e.g., the first package is within boundaries of the first or second conveyor on which the package is placed). A large package may be a package that when placed on one of the first and second conveyors, protrudes laterally out of the corresponding conveyor (e.g., the second package occupies first and second portions of the first and second conveyors, respectively). For example, a large package may be a package that at any time instance occupies at least two conveyors.

In an exemplary embodiment, the first induction station 106a may further include a first set of weight sensors (e.g., load cells) for measuring a weight of each package. The first set of weight sensors may constitute the first weighing sub-system. In an exemplary embodiment, the first induction station 106a may further include a first set of image-capturing sensors (e.g., cameras or photo-eye sensors) for scanning an identifier associated with each package. The first set of image-capturing sensors may constitute the first package identification sub-system. In an exemplary embodiment, the first induction station 106a may further include a first controller (shown in FIG. 2). The first controller may receive sensor data that is indicative of the package type of each package from the second set of sensors. Further, the first controller may receive, from the first weighing sub-system, sensor data indicative of a weight of each package borne by one or more of the plurality of feed conveyors. The first induction station 106a may further include a first set of alignment sensors (e.g., light array sensors) for measuring an alignment of each package with at least one of the first and second conveyors.

Similarly, the second induction station 106b may include a second conveying sub-system, a second dimensioning sub-system, a second weighing sub-system, and a second package identification sub-system. It will be apparent to those of skill in the art that the second induction station 106b may be functionally similar to the first induction station 106a.

The first or second operator 108a or 108b may be an entity (such as a human operator or a robot) that is designated to perform various operations in the storage facility 102. For example, the first and second operators 108a and 108b may be associated with the first and second induction stations 106a and 106b, respectively. The first operator 108a may perform various operations such as, but not limited to, placing the packages on the first induction station 106a, initiating one or more corrective actions based on errors generated by the first induction station 106a, or the like. It will be apparent to those of skill in the art that the second operator 108b may also perform various operations similar to those performed by the first operator 108a. The storage facility 102 is shown to include two induction stations (e.g., the first and second induction stations 106a and 106b) and two operators (e.g., the first and second operators 108a and 108b). It will be apparent to those of skill in the art that the storage facility 102 may include any number of induction stations or operators without deviating from the scope of the disclosure.

The transport vehicles 110 are, for example, robotic vehicles (e.g., automated guided vehicles (AGVs)) that move in the storage facility 102 for picking, carrying, and transporting each package from one location to another location. Each transport vehicle (such as the first or second transport vehicle 110a or 110b) may include one or more carriages for transporting each package. The transport vehicles 110 may be responsive to commands and instructions received from the CS 112. The transport vehicles 110 may include suitable logic, instructions, circuitry, interfaces, and/or code, executable by the circuitry, for executing various operations, such as transporting payloads (e.g., the packages) in the storage facility 102. For example, the first transport vehicle 110a may pick up and transport the packages from the first induction station 106a to the storage area 104 for fulfilment of orders, loading of the packages into the ISUs 116, and/or the like. The transport vehicles 110 may be configured to read the fiducial markers (e.g., the fiducial markers $FM_1$, $FM_2$, $RM_1$, and $RM_2$). Each of the transport vehicles 110 may include various sensors (such as image sensors, RFID sensors, and/or the like) for reading the fiducial markers. Each of the transport vehicles 110 may utilize the fiducial markers for determining a relative position of a corresponding transport vehicle within the storage facility 102 and/or identifying the ISUs 116.

In some embodiments, the CS 112 is a network of computers, a software framework, or a combination thereof, that may provide a generalized approach to create the server implementation. Examples of the CS 112 may include, but are not limited to, personal computers, laptops, mini-computers, mainframe computers, any non-transient and tangible machine that can execute a machine-readable code, cloud-based servers, distributed server networks, or a network of computer systems. The CS 112 may be realized through various web-based technologies such as, but not limited to, a Java web-framework, a .NET framework, a personal home page (PHP) framework, or any other web-application framework. The CS 112 may be maintained by a storage facility management authority or a third-party entity that facilitates inventory management and handling operations for the storage facility 102. It will be understood by a person having ordinary skill in the art that the CS 112 may execute other storage facility management operations as well along with the inventory management operations. Various components of the CS 112 and their functionalities have been described later in conjunction with FIG. 9.

The CS 112 may include a memory (shown in FIG. 9) for storing a virtual map and inventory storage data of the storage facility 102. The virtual map may be indicative of locations of the induction stations 106, the ISUs 116, entry and exit points of the storage facility 102, the fiducial markers in the storage facility 102, or the like. The inventory storage data may be indicative of associations between the packages stored in the storage facility 102 and the ISUs 116. The CS 112 may receive various service requests from an external communication server for retrieval or placement of the packages in the storage facility 102. Based on the received service requests, the CS 112 may identify one or more induction stations (such as the induction stations 106) for the sortation of the packages that are associated with the received service requests. The CS 112 may include multiple communication ports of various types such as, but not limited to, RS232 communication ports, RS485 communication ports, universal serial bus (USB) ports, Ethernet ports, or the like.

The communication network 114 is a medium through which content and messages are transmitted between the induction stations 106, the transport vehicles 110, and the CS 112. Examples of the communication network 114 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the CS 112 may receive a first service request for placement of first and second packages (shown in FIGS. 5A-5C) in the storage facility 102. Based on the received first service request, the CS 112 may communicate a first request to an induction station (e.g., the first induction station 106a) for requesting the first operator 108a to place first and second packages on the first induction station 106a. Based on the first request, the first operator 108a may place the first and second packages on the first induction station 106a.

The first operator 108a may place the first and second packages on the first and second conveyors, respectively, of the first induction station 106a. The first controller may determine first and second weights of the first and second packages, respectively, based on sensor data received from the first weighing sub-system. The first set of image-capturing sensors may scan first and second identifiers of the first and second packages and decode first and second identification codes associated with the first and second packages, respectively, based on the first and second identifiers. The first controller may further determine a package type of each of the first and second packages based on sensor data from the second set of sensors. Based on the first and second weights and the package type of each of the first and second packages, the first controller may issue move commands to the first and second conveyors, respectively, for conveying the first and second packages to the third conveyor of the first induction station 106a. As the first and second packages are being conveyed by the first and second conveyors, the first controller may receive sensor data from the first dimensioning sub-system, allowing the first controller to determine first and second dimensions of the first and second packages, respectively, based on the sensor data.

The first dimensioning sub-system may communicate the sensor data to the first controller when the first and second packages are being conveyed on the first and second conveyors to the third conveyor. For example, the first and second dimensions of the first and second packages may be determined dynamically. The first dimensions of the first package may include at least a first length, a first width, and a first height of the first package. The second dimensions of the second package may include at least a second length, a second width, and a second height of the second package. The first controller may issue first, second, and third speed control commands to the first, second, and third conveyors, respectively, for controlling a first speed, a second speed, and a third speed of the first, second, and third conveyors. The first controller may issue the first, second, and third speed control commands based on the first and second dimensions, the first and second weights, and/or the package type of each of the first and second packages. The first controller may further issue the first, second, and third speed control commands based on a throughput requirement of the CS 112, estimated times of arrival for the transport vehicles 110 to reach a location of the first induction station 106a, distances between the first induction station 106a and each of the transport vehicles 110, speeds of the transport vehicles 110, a required throughput of the first induction station 106a, or the like. In a non-limiting example, the first and second packages are of the first package type (e.g., the first and second packages are small packages).

In an exemplary scenario, the first height of the first package, as indicated by sensor data from the first set of sensors, may be high. In turn, the first controller may determine that a first center of gravity (COG) of the first package is also high. Based on the determination that the first COG of the first package is high, the first controller may issue first and third speed control commands to the first conveyor and the third conveyor, respectively, for lowering the first speed and the third speed, thereby preventing the first package from toppling when the first package is conveyed on the first and third conveyors. The first controller may issue the first and third speed control commands so that the first speed and the third speed are equal when the first package moves from the first conveyor to the third conveyor, ensuring a smooth transition of the first package from the first conveyor to the third conveyor. Similarly, the first controller may issue the second and third speed control commands so that the second speed and the third speed are equal when the second package moves from the second conveyor to the third conveyor, ensuring a smooth transition of the second package from the second conveyor to the third conveyor.

The speed of the conveyors may be determined based on the characteristics of a package. For example, a package that is light and tall (e.g., low weight and large height) is likely to topple over if the conveyor is moving too fast. Furthermore, a package that is heavy and short in height is unlikely to fall off a conveyor, and thus, the conveyor may be operated at a higher speed.

The first controller may communicate the first and second dimensions, the first and second weights, the package types of the first and second packages, and the first and second identification codes to the CS 112 over the communication network 114. The CS 112 may determine first and second package details of the first and second packages, respectively, based on the first and second identification codes. Further, based on the first and second dimensions, the package type of each of the first and second packages, and/or the first and second package details, the CS 112 may select, from the transport vehicles 110, one or more transport vehicles for transporting the first and second packages to first and second locations associated with the first and second packages, respectively. The CS 112 may communicate one or more commands and instructions to the selected one or more transport vehicles for transporting the first and second packages from the third conveyor to the first and second locations. The one or more commands and instructions may include navigation commands and instructions for the selected transport vehicles to reach the location of the first induction station 106a from a current location of each of the selected one or more transport vehicles. The selected one or more transport vehicles may reach the third conveyor, receive the first and second packages from the third conveyor, and transport the first and second packages to the first and second locations. In a non-limiting example, each selected transport vehicle may include one or more conveyors for receiving each package from the third conveyor selectively. For example, the CS 112 may select the first and second transport vehicles 110a and 110b for transporting the first and second packages, respectively. In such a scenario, the first transport vehicle 110a may receive only the first package from the third conveyor and the second transport vehicle 110b may receive only the second package from the third conveyor. In one embodiment, when the first and second transport vehicles 110a and 110b include multiple conveyors for receiving packages, one or more conveyors on each of the first and second transport vehicles 110a and 110b may be allocated to receive the respective first and second packages.

In another embodiment, the CS 112 may receive, from the external server, a second service request for placement of a third package (shown in FIGS. 8A-8C) in the storage facility 102. Based on the received second service request, the CS 112 may communicate a second request to an induction station (e.g., the first induction station 106a) for requesting the first operator 108a to place the third package on the first induction station 106a. Based on the second request, the first operator 108a may place the third package on the first induction station 106a.

The second set of sensors may detect that the third package is of the second package type. The second set of sensors may communicate, to the first controller, sensor data indicative of the detection of the third package. Based on the sensor data from the second set of sensors, the first controller may determine that the third package is of the second package type. In the current embodiment, the third package occupies the first and second portions of the first and second conveyors. The first set of image-capturing sensors may scan a third identifier of the third package and decode a third identification code associated with the third package, based on the third identifier. The first set of image-capturing sensors may communicate the third identification code to the first controller. Further, the first controller may determine a third weight of the third package based on sensor data from the first weighing sub-system, when the third package is placed on the first and second conveyors. The first controller may further determine a weight distribution of the third weight on the first and second conveyors based on the sensor data received from the first weighing sub-system.

Based on the third weight and the weight distribution of the third weight and the package type of the third package, the first controller may issue move commands to the first and second conveyors, respectively, for conveying the third package to the third conveyor. Based on the move commands, the first and second conveyors may move synchronously to avoid a displacement of the third package from a relative position of the third package on the first and second conveyors. For example, the first and second conveyors may move at the same speed for avoiding the displacement of the third package from the relative position of the third package. As the third package is being conveyed by the first and second conveyors, the first controller may receive sensor data from the first dimensioning sub-system, allowing the first controller to determine third dimensions of the third package based on the sensor data. The third dimensions of the third package may include at least a third length, a third width, and a third width of the third package. The first controller may issue first, second, and third speed control commands to the first, second, and third conveyors, respectively, for controlling the first speed, the second speed, and the third speed. The first, second, and third speed control commands may be issued based on the third dimensions, the third weight, and the package type of the third package. The first controller may communicate the third dimensions, the package type of the third package, and the third identification code to the CS 112 over the communication network 114. The CS 112 may determine third package details of the third package based on the third identification code. Based on the third dimensions, the package type of the third package, and/or the third package details, the CS 112 may select, from the transport vehicles 110, one or more transport vehicles for transporting the third package to a third location that corresponds to the third package. The one or more transport vehicles may be further selected based on a distance between the induction station 106a and current locations of each of the one or more transport vehicles. The selected one or more transport vehicles may reach the third conveyor, receive the third package from the third conveyor, and transport the third package to the third location.

In another embodiment, the first operator 108*a* may place the first, second, and third packages on the first induction station 106*a*, for sortation, even when no service requests (e.g., the first and second service requests) are received by the CS 112 from the external server. In another embodiment, the first induction station 106*a* may not include the first controller and operations performed by the first controller may be performed by the CS 112. Various operations of the induction stations 106, the transport vehicles 110, and the CS 112 have been further described in conjunction with FIGS. 2, 3, 5A-5C, and 8A-8C.

Figure 2:
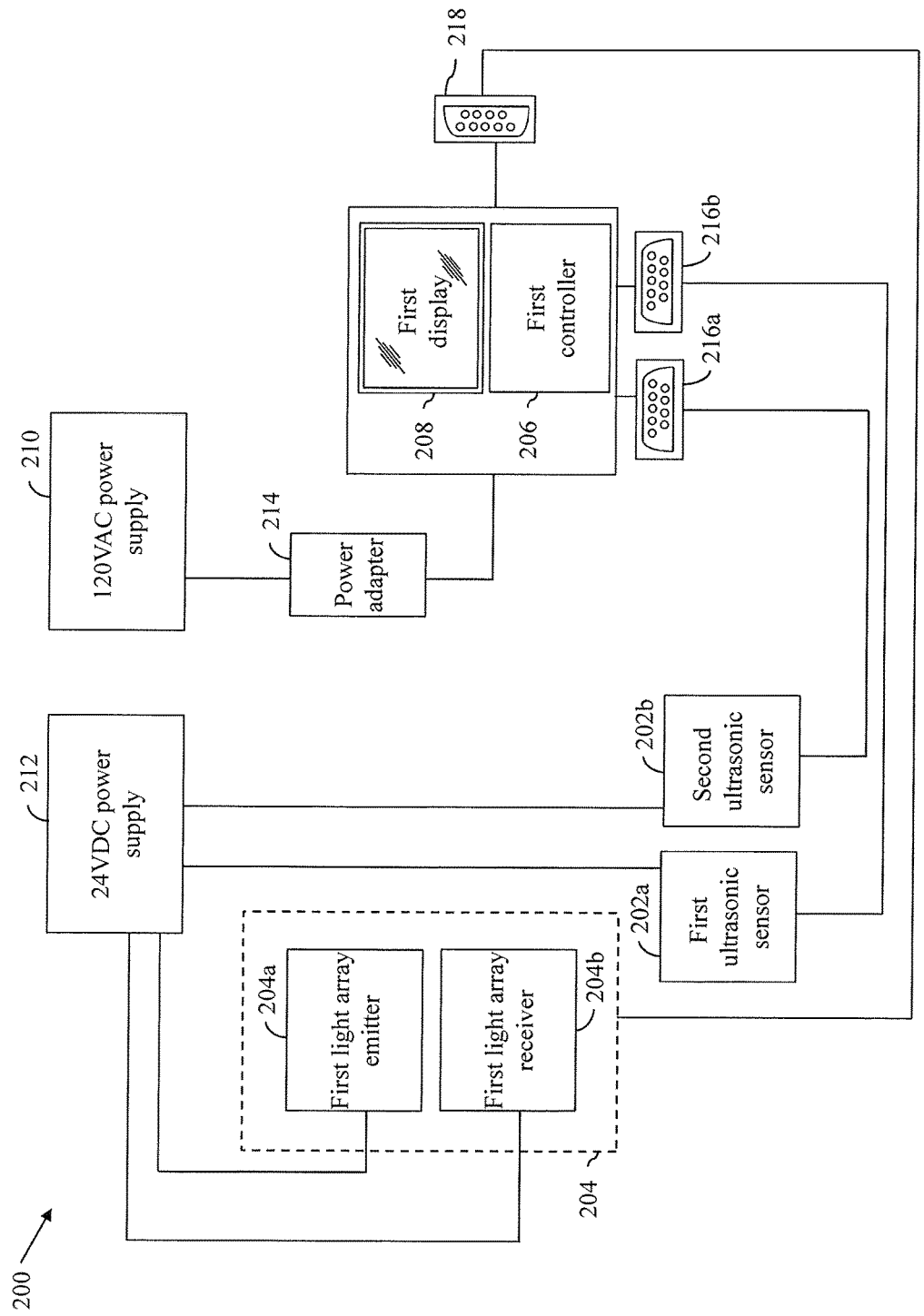
FIG. 2 is a block diagram that illustrates an architecture of a dimensioning sub-system of an induction station of FIG. 1, in accordance with an embodiment of the present disclosure.

FIG. 2 is a block diagram 200 that illustrates an architecture of the first dimensioning sub-system of the first induction station 106*a*, in accordance with an embodiment of the present disclosure. The block diagram 200 includes first and second ultrasonic sensors 202*a* and 202*b* (hereinafter, the first and second ultrasonic sensors 202*a* and 202*b* are referred to as 'the first set of ultrasonic sensors 202'), a first light array emitter 204*a* and a first light array receiver 204*b* (hereinafter a first set of light array sensors 204), the first controller 206, and a first display 208. The block diagram 200 further includes a first power supply module 210 and a second power supply module 212. The first power supply module 210 may be a main power supply and the second power supply module 212 may be a low voltage power supply (such as a battery) for powering sensors (e.g., the first set of ultrasonic sensors 202). In a non-limiting example, the first power supply module 210 provides a 120 Volt (V) alternating current (AC) power supply and that the second power supply module 212 provides a 24V direct current (DC) power supply. The first induction station 106*a* may further include a first power adapter 214, first and second RS232 communication ports 216*a* and 216*b* of the first controller 206, and a first RS485 communication port 218 of the first controller 206.

The first set of ultrasonic sensors 202 may include the first and second ultrasonic sensors 202*a* and 202*b* used for measurement of a height of each package conveyed by the first and second conveyors, respectively. For example, the first and second ultrasonic sensors 202*a* and 202*b* are configured to collect sensor data for dynamically measuring the height each package conveyed by the first and second conveyors, respectively. To measure a height of a target (e.g., the first package), the first ultrasonic sensor 202*a* may emit an ultrasonic wave towards the first package and may receive the ultrasonic wave when the ultrasonic wave is reflected by the first package. The first ultrasonic sensor 202*a* may determine a time duration that has elapsed between the emission and the reception of the ultrasonic wave. The time duration may be inversely proportional to a height of the first package. Based on the elapsed time duration and a velocity of the ultrasonic wave, the first ultrasonic sensor 202*a* may measure the height of the first package. The first package may be in motion, on the first conveyor, when the first ultrasonic sensor 202*a* measures the height of the first package. So, the first ultrasonic sensor 202*a* may collect multiple readings of the height of the first package. The height of the first package, as measured by the first ultrasonic sensor 202*a*, may vary based on a distance of the first package from the first ultrasonic sensor 202*a*. So, the first ultrasonic sensor 202*a* may measure the height of the first package multiple times. In such a scenario, the height of the first package, as measured by the first ultrasonic sensor 202*a*, may be maximum when a distance between the first ultrasonic sensor 202*a* and the first package is minimum. The maximum height of the first package, as measured by the first ultrasonic sensor 202*a*, may correspond to the first height of the first package.

Figure 4:
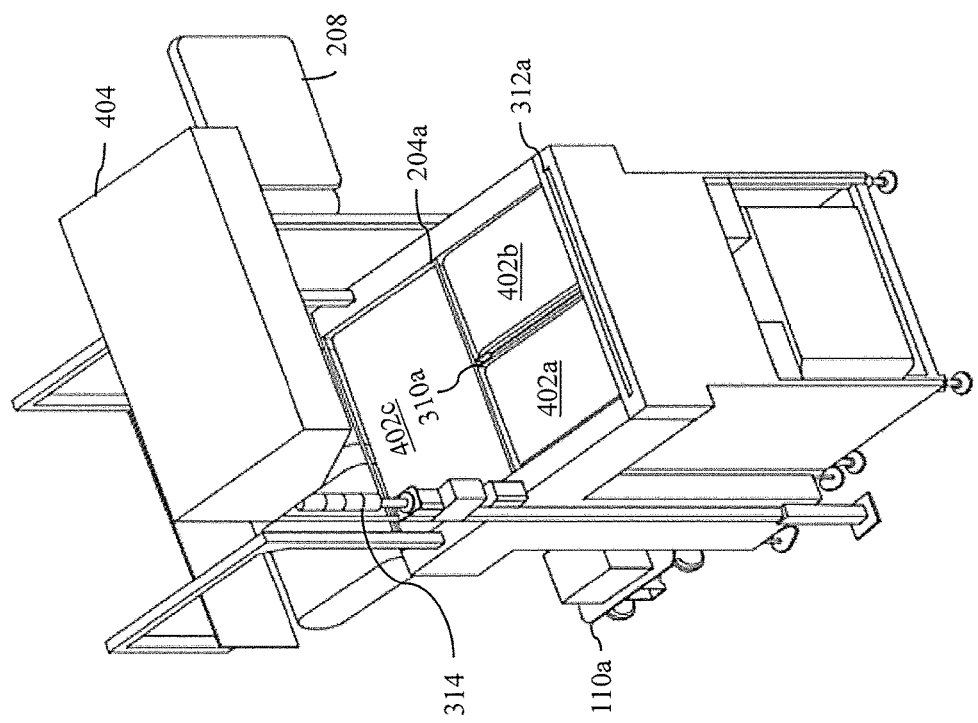
FIG. 4 is a diagram that illustrates a three-dimensional (3D) representation of the induction station, in accordance with an embodiment of the present disclosure.

The first and second ultrasonic sensors 202*a* and 202*b* may be installed at first and second pre-determined heights above the first and second conveyors, respectively. In a non-limiting example, the first and second pre-determined heights are equal. In an exemplary scenario, the first set of ultrasonic sensors 202 may be installed on a first canopy or a first panel (as shown in FIG. 4) of the first induction station 106*a* that covers the first and second conveyors. It will be apparent to those of skill in the art that other sensors, such as radar level transmitters or light array sensors, may be used for determining a height of each package, in lieu of the first set of ultrasonic sensors 202, without deviating from the scope of the disclosure.

Figure 6A:
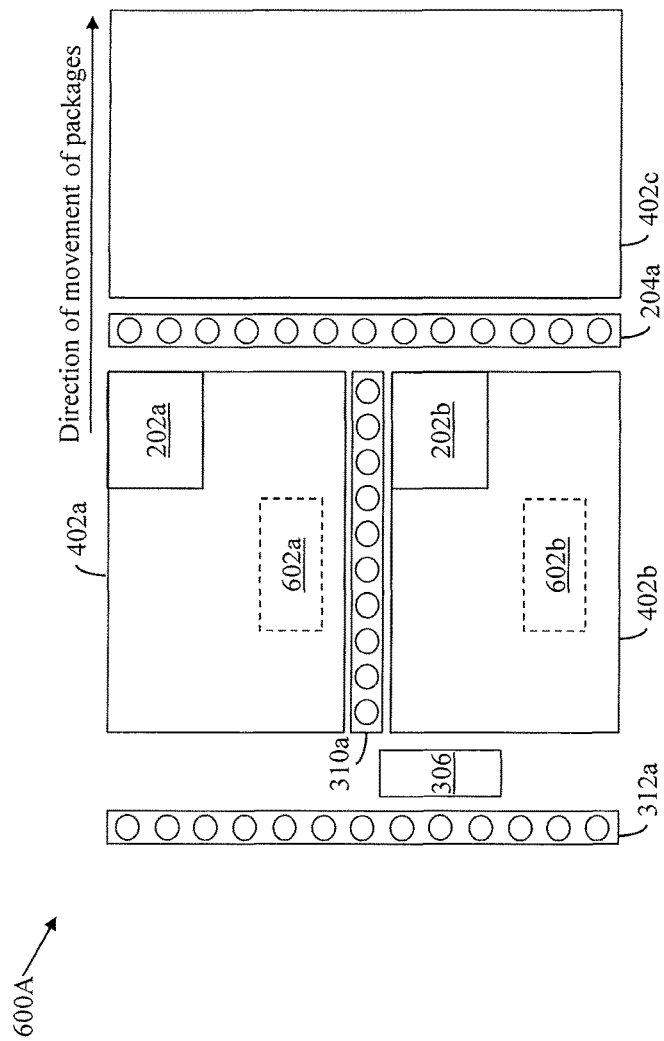
FIGS. 6A and 6B are block diagrams that illustrate top and side views, respectively, of the induction station, in accordance with an embodiment of the present disclosure.
Figure 6B:
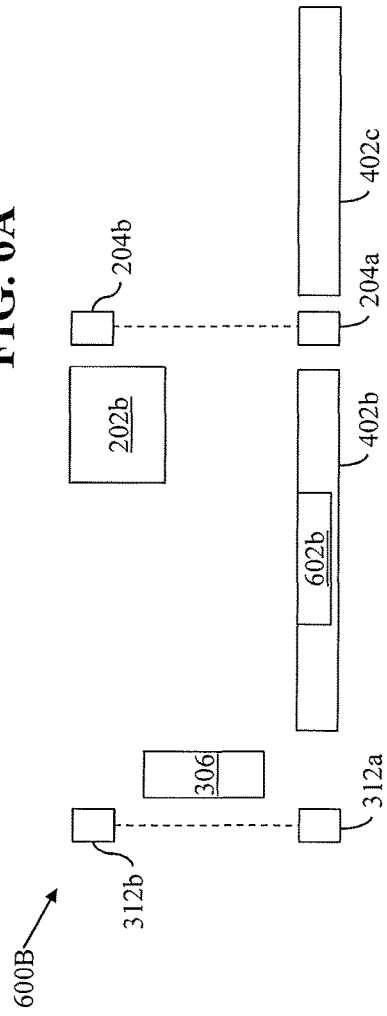

The first set of light array sensors 204 may be used to measure a length and a width of each package conveyed by the first and second conveyors. For example, the first set of light array sensors 204 may be configured to collect sensor data for dynamically measuring the length and width of package conveyed by the first and second conveyors. A set of light array sensors (e.g., the first set of light array sensors 204) may include an emitter component (e.g., the first light array emitter 204*a*) for emitting light rays (e.g., infrared light rays) and a receiver component (e.g., the first light array receiver 204*b*) to receive the emitted light rays. Any object (e.g., the first package) passing in between the emitter and receiver components may obstruct one or more of the emitted light rays. The first length and width of the first package may be determined based on a number of light rays, of the first set of light array sensors 204, obstructed by the first package, when the first package moves across the first set of light array sensors 204. The first set of light array sensors 204 may communicate, to the first controller 206, sensor data indicative of the one or more light rays, obstructed by the first package. In the present embodiment, the first light array emitter 204*a* may be installed (as shown in FIGS. 4, 6A, and 6B) in a first gap between the plurality of feed conveyors (such as the first and second conveyors) and the one or more buffer conveyors (such as the third conveyor). In one embodiment, the first light array receiver 204*b* may be installed diametrically opposite the first light array emitter 204*a*, at a third pre-determined height above the first and second conveyors, on the first panel or the first canopy. In a non-limiting example, the first, second, and third pre-determined heights are equal. In another embodiment, positions of the first light array receiver 204*b* and the first light array emitter 204*a* may be swapped.

The first set of ultrasonic sensors 202 and the first set of light array sensors 204 may communicate the sensor data to the first controller 206 using various communication interfaces, for example, RS232 communication ports, RS485 communication ports, Ethernet communication ports, and USB communication ports. As shown in FIG. 2, the first and second ultrasonic sensors 202*a* and 202*b* may communicate with the first controller 206 by way of the first and second RS232 communication ports 216*a* and 216*b*, respectively. The first set of light array sensors 204 may communicate the sensor data to the first controller 206, by way of the first RS485 communication port 218 of the first controller 206. The first set of ultrasonic sensors 202 and the first set of light array sensors 204 may draw power from the second power supply module 212. The first set of ultrasonic sensors 202 and the first set of light array sensors 204 constitute the first dimensioning sub-system.

The first controller 206 may be a controller (e.g., a programmable logic controller, an industrial computer, or the like) of the first induction station 106*a*. In a non-limiting example, it is assumed that the first controller 206 is an industrial computer. The first controller 206 may receive sensor data from the first set of ultrasonic sensors 202 and the first set of light array sensors 204. The first controller 206 may determine dimensions (e.g., the first length, width, and height) of packages (e.g., the first package) based on the sensor data received from the first set of ultrasonic sensors 202 and the first set of light array sensors 204. For example, the first controller 206 may determine the first height of the first package, based on the sensor data from the first ultrasonic sensor 202*a*. In other words, the first controller 206 may dynamically determine the first height of the first package, based on the sensor data collected by the first ultrasonic sensor 202*a* (e.g., the sensor data obtained from the first set of ultrasonic sensors 202). The first controller 206 may determine the first length and the first width of the first package based on the sensor data received from the first set of light array sensors 204.

The sensor data received (e.g., obtained) from the first set of light array sensors 204 may be indicative of the number of light rays, of the first set of light array sensors 204, obstructed by the first package when the first package moves across the first set of light array sensors 204, a time duration for which each light ray is obstructed, or the like. The first controller 206 may dynamically determine the first length and width based on the number of light rays obstructed by the first package and the time duration for which each light ray is obstructed, respectively. For example, the first controller 206 may determine the first length and width of the first package based on the sensor data collected by the first set of light array sensors 204. The first controller 206 may further determine a first relative position of the first package on the first conveyor based on the sensor data received from the first set of light array sensors 204. In some scenarios, the first height of the first package, as determined by the first controller 206, may not be equal to an actual height of the first package. For example, the first height of the first package, as determined by the first controller 206, may be less than the actual height of the first package if the first relative position of the first package on the first conveyor is not correctly aligned. Such a scenario may occur if the first relative position of the first package is not centrally aligned with respect to the first ultrasonic sensor 202*a*. Based on the first relative position of the first package, the first controller 206 may determine a first correction factor for measuring the actual height of the first package.

Based on the first correction factor and the maximum height of the first package, the first controller 206 may determine the actual height of the first package. In a non-limiting example, based on the sensor data received from the first set of light array sensors 204, the first controller 206 may generate a first point cloud array in cartesian coordinate frame such that the first point cloud array represents a first boundary of the first package. The first controller 206 may use one or more algorithms (e.g., a convex hull algorithm) to remove one or more concavities from the first point cloud array, generating a second point cloud array with clear boundary points. Based on the second point cloud array, the first controller 206 may determine a first minimum bounding rectangle that encompasses the second point cloud array. A length and width of the first minimum bounding rectangle constitute the first length and width of the first package, respectively. Therefore, the first controller 206 may measure the first length and width by way of the first minimum bounding rectangle. Based on the first dimensions (e.g., the first length, width, and height) of the first package, the first controller 206 may determine a first volume of the first controller 206. It will be apparent to those of skill in the art that the first controller 206 may measure dimensions of other packages (e.g., the second and third packages) in a manner similar to the measurement of the first dimensions of the first package.

The first controller 206 may receive the sensor data from the first set of ultrasonic sensors 202 and the first set of light array sensors 204 by way of various communication methods or protocols such as, but not limited to, Modbus, Process field bus (PROFIBUS), or process field network (PROFINET). The first controller 206 may be of various types such as, but not limited to, a proportional controller, a derivative controller, an integral controller, a proportional derivative controller, a proportional integral derivative controller, or the like.

In a non-limiting example, the first controller 206 and the first display 208 of the first controller 206 may be integrated in a first housing. The first controller 206 may render a first user interface (UI) on the first display 208. The first UI may allow the first operator 108*a* to interact with the first induction station 106*a*. The first UI may present one or more instructions to the first operator 108*a*, based on requests (e.g., the first request) received by the first controller 206 from the CS 112. For example, the first UI may present one or more instructions to the first operator 108*a*, requesting the first operator 108*a* to place the first and second packages on the first induction station 106*a*, based on the first request from the CS 112. The first UI may further present, package information (e.g., the first dimensions, the first package details, the first weight, or the like) of packages (e.g., the first package) conveyed by the first induction station 106*a*. The first UI may further present one or more error messages, requesting the first operator 108*a* to take corrective action, based on one or more errors in the conveying of the packages (e.g., the first and second packages). For example, the first UI presents one or more errors or commands pertinent to the conveying of the packages. The first controller 206 and the first display 208 may draw power from the first power supply module 210 by way of the first power adapter 214.

Figure 3:
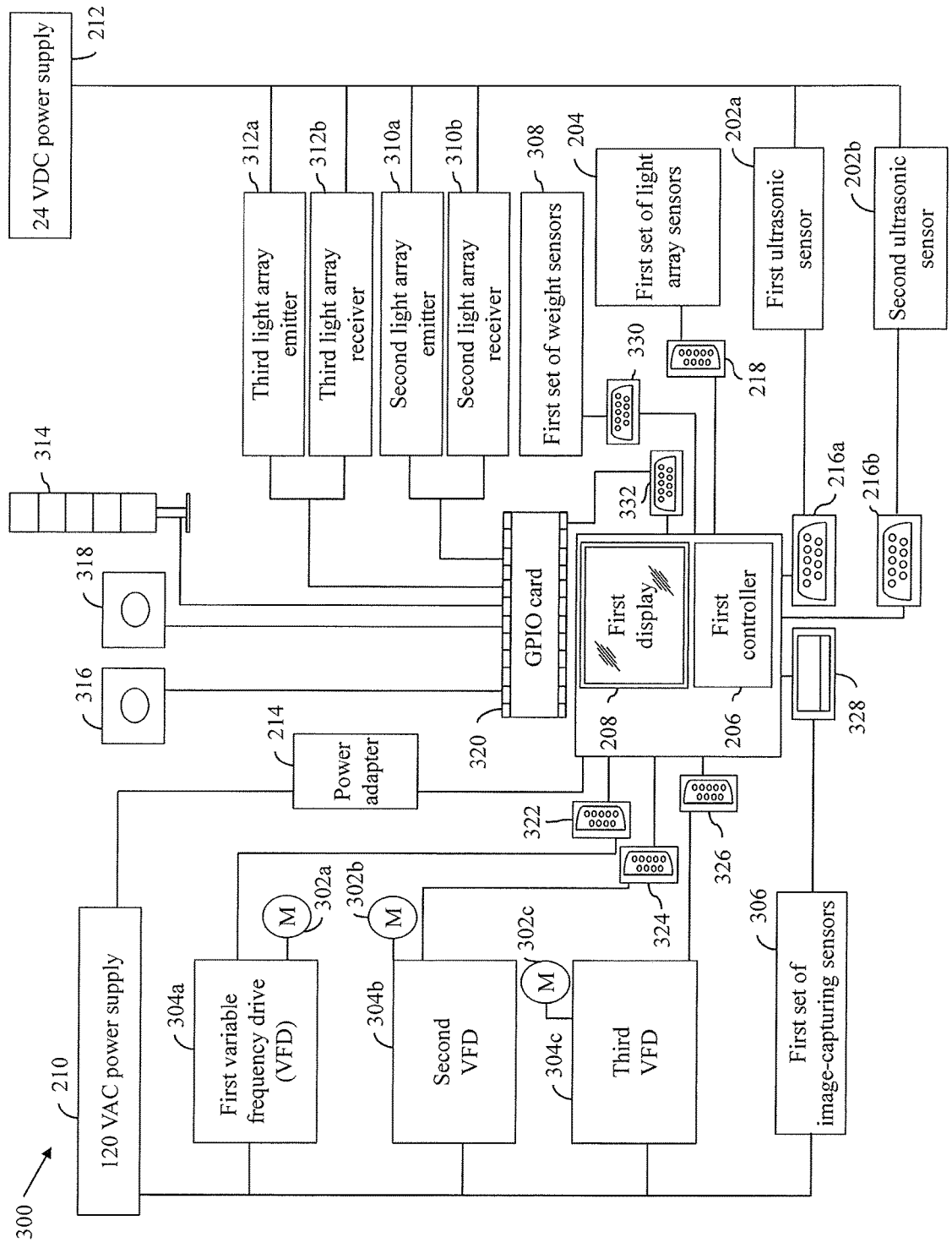
FIG. 3 is a block diagram that illustrates an architecture of the induction station, in accordance with an embodiment of the present disclosure.

FIG. 3 is a block diagram 300 that illustrates an architecture of the first induction station 106*a*, in accordance with an embodiment of the present disclosure. The first induction station 106*a* may include first through third motors 302*a*-302*c* (hereinafter, the first through third motors 302*a*-302*c* are collectively referred to as 'the motors 302') of the first through third conveyors. The first induction station 106*a* may further include first through third variable frequency drives (VFDs) 304*a*-304*c* (hereinafter, the first through third VFDs 304*a*-304*c* are collectively referred to as 'the VFDs 304') associated with the motors 302. The first induction station 106*a* may further include the first set of image-capturing sensors (hereinafter, the first set of image-capturing sensors is referred to as 'the first set of image-capturing sensors 306'). The first induction station 106*a* may further include a first set of weight sensors 308, a second light array emitter 310*a*, and a second light array receiver 310*b* (hereinafter, the second light array emitter 310*a* and the second light array receiver 310*b* are collectively referred to as the 'second set of light array sensors 310'). The first induction station 106*a* may further include a third light array emitter 312*a* and a third light array receiver 312*b* (hereinafter, the third light array emitter 312*a* and the third light array receiver 312*b* are collectively referred to as the 'third set of light array sensors 312'). The first induction station 106a may further include a first visual indicator 314, a first push-button 316, a second stop push-button 318, and a first general-purpose input-output (GPIO) card 320. The first induction station 106a also includes the first set of ultrasonic sensors 202, the first set of light array sensors 204, the first power supply module 210, the second power supply module 212, and the first power adapter 214.

The first through third motors 302a-302c may be used to operate the first through third conveyors, respectively. Each of the motors 302 may be of various types such as, but not limited to, synchronous motors, induction motors, brushless direct current (DC) motors, brushed DC motors, or the like. The first induction station 106a may include one or more motor drivers to control the motors 302. In the current embodiment, the first induction station 106a includes the VFDs 304 to control and manage a rotational speed of each of the motors 302 that, in turn, may control and manage the first speed, the second speed, and the third speed of the first through third conveyors, respectively. The first through third VFDs 304a-304c may be further used to control a first torque, a second torque, and a third torque of the first through third motors 302a-302c, respectively. To control the first speed, the second speed, and the third speed, the first controller 206 may communicate a command (e.g., a move command), indicative of an intended speed of a conveyor (e.g., the first conveyor), to a corresponding VFD (e.g., the first VFD 304a). In the current embodiment, it is assumed that the first controller 206 communicates with the VFDs 304 using a serial communication protocol, by way of a set of RS485 communication ports of the first controller 206. The set of RS485 communication ports may include second through fourth RS485 communication ports 322-326 for communication with the first through third VFDs 304a-304c, respectively. The first VFD 304a may, based on the intended speed, vary an input frequency and input voltage of the first motor 302a to control the first speed of the first conveyor. Functioning of the VFDs 304 and the motors 302 will be known to those of skill in the art. In the current embodiment, the VFDs 304 may draw power from the first power supply module 210. In one embodiment, the first through third motors 302a-302c may be configured to control a direction of movement of the first through third conveyors, respectively, thereby allowing packages to be conveyed from the first and second conveyors to the third conveyor and from the third conveyor to the first and second conveyors.

The first set of image-capturing sensors 306 may include one or more image-capturing sensors such as, but not limited to, cameras or photo-eye sensors. The first set of image-capturing sensors 306 may constitute the first package identification sub-system. In a non-limiting example, the first set of image-capturing sensors 306 may include a first camera for scanning an identifier of each package (e.g., the first through third packages) placed on the first conveyor and/or the second conveyor. The first set of image-capturing sensors 306 may consequently decode each scanned identifier to determine an identification code associated with each package. Each package may be associated with a unique identification code. Each identifier may be one of a barcode, a QR code, or the like. The first set of image-capturing sensors 306 may communicate, to the first controller 206, sensor data that is indicative of the identification code associated with each package. In a non-limiting example, the first set of image-capturing sensors 306 may communicate with the first controller 206, by way of a first USB port 328 of the first controller 206. In other words, the first controller 206 may receive the sensor data from the first set of image-capturing sensors 306. The identification code associated with each package may be indicative of package details of a corresponding package. The package details of the corresponding package may be stored in the memory of the CS 112. The package details of a package may be indicative of the inventory items stored in the package, a product category associated with each inventory item, a location corresponding to the package, or the like. The first set of image-capturing sensors 306 may draw power from the first power supply module 210.

The first set of weight sensors 308 may include one or more load cells (shown in FIGS. 6A and 6B) and one or more weighing controllers. Each load cell may be installed within each of the plurality of feed conveyors (such as the first and second conveyors). Each load cell generates a signal (e.g., a millivolt (mV) signal) based on a load (e.g., the first through third packages) placed on a corresponding conveyor. The signal generated by each load cell may be provided as input to a corresponding weighing controller. Each weighing controller may measure a weight of the load placed on the corresponding conveyor based on the signal from the corresponding load cell. In a non-limiting example, the first set of weight sensors 308 may include first and second load cells (as shown in FIGS. 6A and 6B) and first and second weighing controllers associated with the first and second load cells, respectively. The first and second load cells may be installed within the first and second conveyors, respectively. The first and second load cells may generate first and second signals when packages are placed on the first and second conveyors. The first and second signals are provided as input to the first and second weighing controllers, respectively. The first and second weighing controllers may collect sensor data indicative of the weight borne by each of the first and second conveyors. The first and second weighing controllers may communicate, using serial communication, the sensor data to the first controller 206 over a third RS232 communication port 330 of the first controller 206. The first controller 206 may determine the weight of each of the packages, based on the sensor data collected by the first and second weighing controllers. The first set of weight sensors 308 may be triggered when packages (e.g., the first, second, and third packages) are placed on the first conveyor and/or the second conveyor. When triggered, the first set of weight sensors 308 may communicate, to the first controller 206, the sensor data indicative of the weight of each package of the packages (e.g., a weight or a load borne by each of the first and second conveyors). The first controller 206 may issue move commands to the first through third VFDs 304a-304c based on the weight borne by each of the first and second conveyors. The first through third VFDs 304a-304c may operate the first through third conveyors based on the move commands issued by the first controller 206. For example, if a weight borne by the first conveyor is high, the first motor 302a may be operated at a high torque. Further, the first speed, the second speed, and the third speed of the first through third conveyors may be controlled by the first controller 206, based on the weight borne by each conveyor of the first through third conveyors.

The second set of light array sensors 310 may include one or more light array sensors for detecting the package type of each package placed on at least one of the first and second conveyors. The second set of light array sensors 310 may detect whether a package is of the first package type or the second package type. The second set of light array sensors 310 may be installed in a second gap between the first and second conveyors. In a non-limiting example, the second light array emitter 310a may be installed in the second gap while the second light array receiver 310b may be installed at a fourth pre-determined height above the first and second conveyors and may be diametrically opposite to the light array emitter 310a. In another embodiment, positions of the second light array receiver 310b and the second light array emitter 310a may be swapped. In a non-limiting example, the fourth pre-determined height and the second pre-determined height may be equal. A package may be detected as belonging to the first package type when the package does not obstruct any light rays emitted by the second light array emitter 310a. A package may be detected as belonging to the second package type when one or more light rays emitted by the second light array emitter 310a are obstructed by the package when the package is placed on the first and second conveyors.

Based on the obstruction of the one or more light rays, the second set of light array sensors 310 may communicate, to the first controller 206, sensor data indicating whether the package placed on at least one of the first and second conveyors is of the first package type or second package type. In a non-limiting example, the second set of light array sensors 310 may communicate the sensor data, indicative of the package type of each package placed on at least one of the first and second conveyors, to the first GPIO card 320 as a first digital input (DI) signal. The first DI signal may be a voltage signal. The voltage signal may be present in one of two states such as a high or low voltage state (e.g., 5V' and '0V' in analog format or '1' and '0' in digital format). In an exemplary scenario, a value of the first DI signal may be equal to '0' when a package of the first package type is placed on one of the first and second conveyors (e.g., if none of the light rays emitted by the second light array emitter 310a are obstructed by the package). The value of the first DI signal may be equal to '1' when a package of the second package type is placed on the first and second conveyors. The value of the first DI signal (e.g., the sensor data of the second set of light array sensors 310) may be communicated to the first controller 206 by the first GPIO card 320 by way of a fourth RS232 communication port 332 of the first controller 206. The first induction station 106a, by virtue of the first and second conveyors, may be capable of conveying, simultaneously, two packages of the first package type or a single package of the second package type at a given time instance. The second set of light array sensors 310 may draw power from the second power supply module 212.

The third set of light array sensors 312 may include one or more light array sensors for detecting a presence of an operator (e.g., the first operator 108a) within a first range of the first induction station 106a or the first and second conveyors of the first induction station 106a. The third set of light array sensors 312 may be installed along an edge of the first and second conveyors (as shown in FIGS. 4, 6A, and 6B). In the current embodiment, the third light array emitter 312a may be installed at the same level as the first and second conveyors and the third light array receiver 312b may be installed diametrically opposite to the third light array emitter 312a, at a fifth pre-determined height from the first and second conveyors. In another embodiment, positions of the third light array emitter 312a and the third light array receiver 312b may be swapped. In a non-limiting example, the first pre-determined height and the fifth pre-determined height may be equal. The third set of light array sensors 312 may draw power from the second power supply module 212.

The third set of light array sensors 312 may be installed for ensuring a safety of the first operator 108a. For example, when the first operator 108a attempts to place packages (e.g., the first and second packages) on the first and second conveyors, the third set of light array sensors 312 may detect the presence of the first operator 108a in the first range when a body part (e.g., a hand) of the first operator 108a obstructs one or more light rays emitted by the third light array emitter 312a. The third set of light array sensors 312 may communicate as a second DI signal to the first GPIO card 320, sensor data indicative of the presence of the first operator 108a. In an exemplary scenario, a value of the second DI signal may be equal to '0' when the presence of the first operator 108a is not detected (e.g., when none of the one or more light rays emitted by the third light array emitter 312a are obstructed). The value of the second DI signal may be equal to '1' when the presence of the first operator 108a is detected (e.g., when the one or more light rays emitted by the third light array emitter 312a are obstructed by the first operator 108a). The second DI signal may be communicated to the first GPIO card 320 by the third set of light array sensors 312 by way of the fourth RS232 communication port of the first controller 206. When the presence of the first operator 108a is detected, the first controller 206 may communicate one or more commands to the first and second VFDs 304a and 304b for immobilizing the first and second conveyors.

The first visual indicator 314 may be a visual indicator that is configured to display one or more visual signals to one or more operators (e.g., the first operator 108a) based on a current operational state of the first induction station 106a. The first visual indicator 314 may receive a first digital output (DO) signal from the first controller 206 by way of the first GPIO card 320. The first DO signal may be generated, by the first controller 206, based on the current operational state of the first induction station 106a. The first DO signal may be a voltage signal. In a non-limiting example, a value of the first DO signal may be equal to '0' or '1' depending on whether the first induction station 106a is operating without any errors. In an exemplary scenario, the first visual indicator 314 may display a first visual signal when the value of the first DO signal is equal to '0' and a second visual signal when the value of the first DO signal is equal to '1', respectively.

The first and second push-buttons 316 and 318 are, for example, stop and emergency stop push-buttons, respectively, that may allow the first operator 108a to manually halt the operation of the first induction station 106a. For example, the first operator 108a may use one of the first and second push-buttons 316 and 318 to halt the first, second, and third conveyors. Sensor data from the first and second push-buttons may constitute third and fourth DI signals. The first and second push buttons 316 and 318 may be connected to the first GPIO card 320. The third or fourth DI signal may be a voltage signal. The voltage signal may be present in at least one of two states such as a high or low voltage state. In a non-limiting example, the high and low voltage states may be represented by '5V' and '0V', respectively, in analog format. In digital format, the high and low voltage states may be represented by '1' and '0', respectively. In an exemplary scenario, default values (e.g., when the first and second push-buttons 316 and 318 are not pushed) for the third and fourth DI signals may be '0'. Values of the third and fourth DI signals may be equal to '1' when the first operator 108a presses the first and second push-buttons, respectively. The third and fourth DI signals may be received by the first controller 206 by way of the fourth RS232 communication port 332. If the value of the third DI signal or the fourth DI signal is equal to '1', the first controller 206 may halt the first through third conveyors.

The first GPIO card 320 is an input module that may configured to receive various types of signals such as, but not limited to, DI signals, DO signals, analog input (AI) signals, and analog output (AO) signals. The first GPIO card 320 may receive, by way of the fourth RS232 communication port 332, the DO and AO signals from the first controller 206. The first GPIO card 320 may communicate the DO and AO signals to corresponding components (e.g., the first visual indicator 314). The first GPIO card 320 may further receive the DI and AI signals from sensors (e.g., the second set of light array sensors 310). The first GPIO card 320 may transmit the DI and AI signals to the first controller 206, by way of the fourth RS232 communication port 332. Methods of interfacing sensors (e.g., the third set of light array sensors 312) to the first GPIO card 320 are known to those of skill in the art. It will be apparent to those of skill in the art that the first induction station 106a may use separate DI, DO, AI, and AO cards in lieu of the first GPIO card 320.

FIG. 4 is a diagram that illustrates a three-dimensional (3D) representation of the first induction station 106a, in accordance with an embodiment of the disclosure. As shown in FIG. 4, the first induction station 106a includes the plurality of feed conveyors such as the first conveyor 402a and the second conveyor 402b that are parallel to each other. The first induction station 106a further includes the one or more buffer conveyors such as the third conveyor 402c. The first induction station 106a further includes the first canopy 404. The first canopy 404 is at the first pre-determined height (e.g., the second, the third, the fourth, or the fifth pre-determined height). The first set of ultrasonic sensors 202 and the first set of image-capturing sensors 306 may be installed on a bottom side of the first canopy 404. In FIG. 4, there is further the first light array emitter 204a, the second light array emitter 310a, and the third light array emitter 312a, the first visual indicator 314, the first display 208 and the first transport vehicle 110a. The second light array receiver 310b and the third light array receiver 312b may be installed at the bottom side of the first canopy 404, diametrically opposite to the second light array emitter 310a and the third light array emitter 312a, respectively.

Figure 5A:
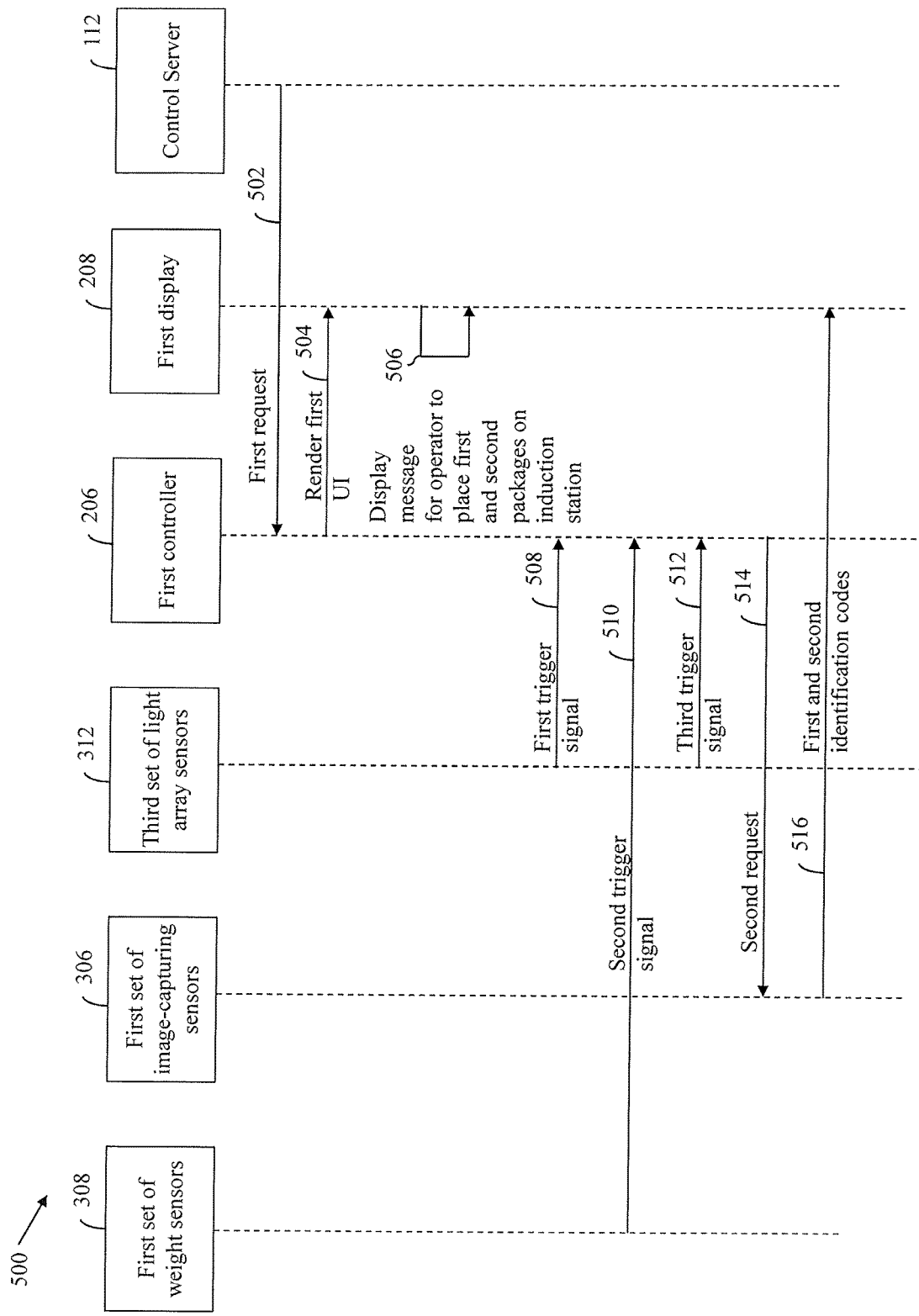
FIGS. 5A-5C are diagrams that collectively illustrate an exemplary process flow for conveying first and second packages, in accordance with an embodiment of the present disclosure.
Figure 5B:
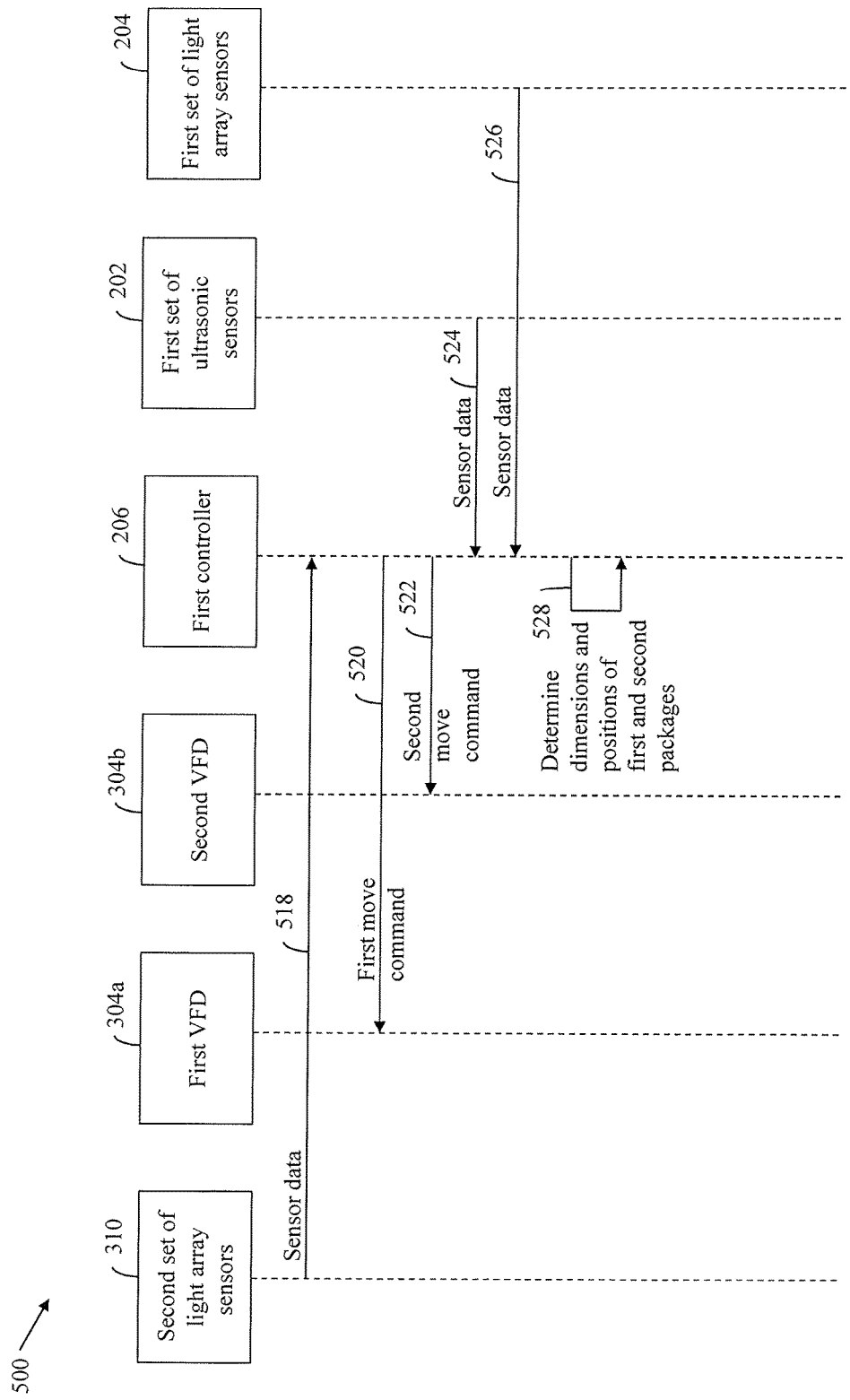
Figure 5C:
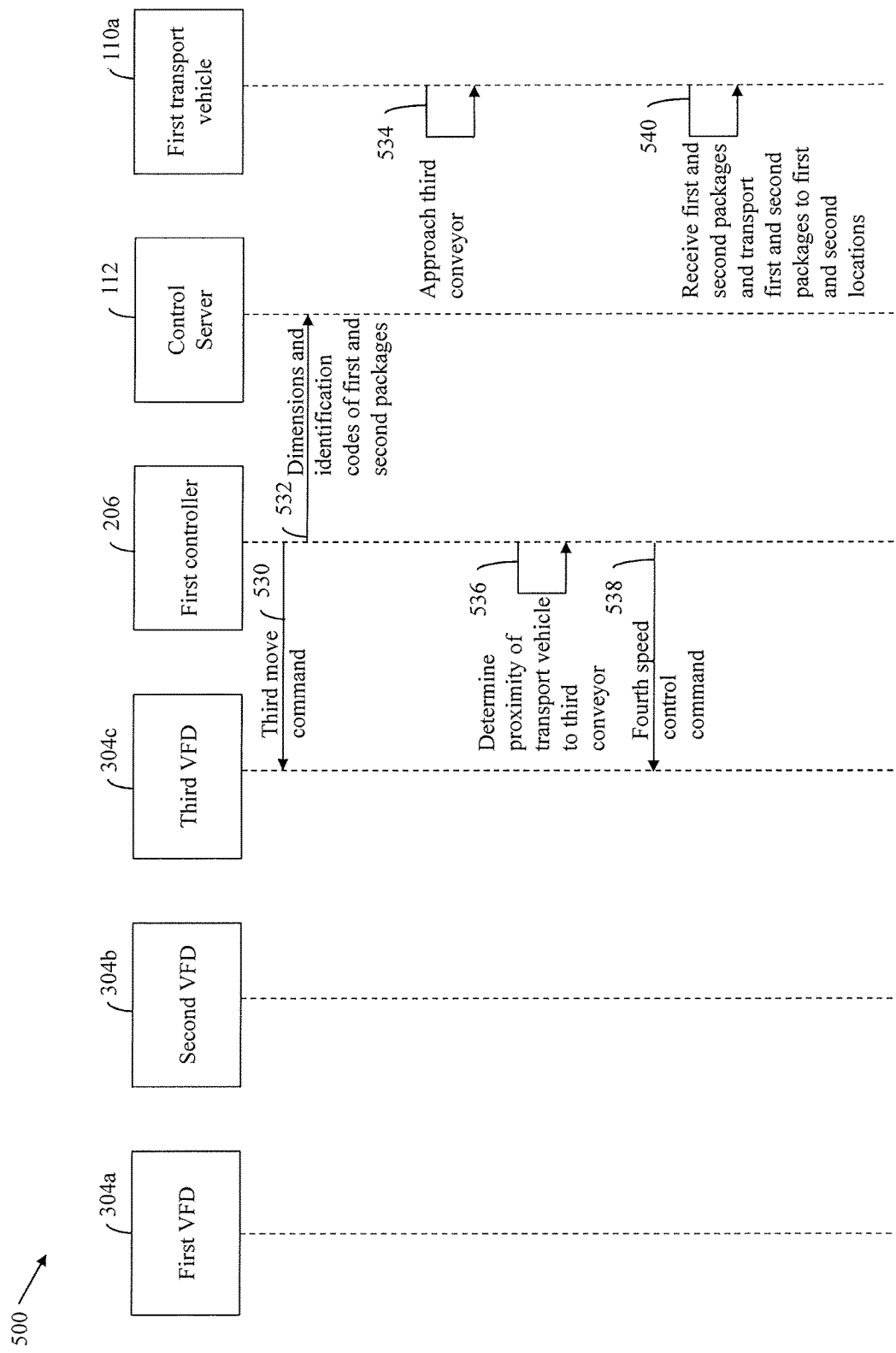

FIGS. 5A-5C are diagrams that collectively illustrate an exemplary process flow 500 for conveying the first and second packages, in accordance with an embodiment of the present disclosure. The exemplary process flow 500 involves the first transport vehicle 110a, the CS 112, the first set of ultrasonic sensors 202, the first set of light array sensors 204, the first controller 206, the first display 208, the first display 208, the VFDs 304, the first set of image-capturing sensors 306, the first set of weight sensors 308, the second set of light array sensors 310, and the third set of light array sensors 312.

The CS 112 may receive, from an external server or an entity, the first service request for placing the first and second packages in the storage facility 102. Based on the first service request, the CS 112 may identify an induction station (e.g., the first induction station 106a) for performing an operation (e.g., sortation of the first and second packages for placing in the storage facility 102) corresponding to the first service request. The first induction station 106a may be identified based on various factors such as, but not limited to, a proximity of the first and second packages to the first induction station 106a, a number of induction stations available for handling the first service request, or the like. In a non-limiting example, the CS 112 identifies the first induction station 106a for handling the first service request.

Based on the first service request, the CS 112 may communicate the first request to the first controller 206 (as shown by arrow 502). Based on the first request, the first controller 206 may render the first UI on the first display 208 (as shown by arrow 504). The first UI may present, to the first operator 108a, a first message instructing the first operator 108a to place the packages such as the first and second packages on the first induction station 106a (as shown by arrow 506). In a non-limiting example, the first operator 108a may place the first and second packages on the first and second conveyors 402a and 402b, respectively. The first operator 108a may place the first and second packages on the first and second conveyors 402a and 402b, either simultaneously or one after the other. When the first operator 108a places the first and second packages on the first and second conveyors 402a and 402b, one or more light rays emitted by the third light array emitter 312a may be obstructed by one or more body parts (e.g., hands) of the first operator 108a. Based on the obstruction of the one or more light rays, the third set of light array sensors 312 may communicate a first trigger signal (e.g., the second DI signal having a value equal to '1') to the first controller 206, indicating that the first operator 108a is in close proximity to the first and second conveyors 402a and 402b (as shown by arrow 508). To ensure the safety of the first operator 108a, the first controller 206 may communicate first and second stop commands to the first and second VFDs 304a and 304b, based on the second DI signal. Based on the first and second stop commands, the first and second VFDs 304a and 304b may stop the first and second motors 302a and 302b, immobilizing the first and second conveyors 402a and 402b.

When the first operator 108a places the first and second packages on the first and second conveyors 402a and 402b, respectively, the first set of weight sensors 308 (e.g., the first and second weight controllers) may communicate a second trigger signal to the first controller 206 (as shown by arrow 510). The second trigger signal may include sensor data of the first set of weight sensors 308 that may be indicative of a load on each of the first and second conveyors 402a and 402b. In other words, the sensor data from the first set of weight sensors 308 may be indicative of the first and second weights of the first and second packages, respectively. After placing the first and second packages on the first and second conveyors 402a and 402b, the first operator 108a may move away from the first induction station 106a. Consequently, the one or more light rays emitted by the third light array emitter 312a may not obstructed. As a result, the value of the second DI signal may be equal to '0'. The first controller 206 may receive a third trigger signal (e.g., the second DI signal having the value equal to '0') from the third set of light array sensors 312, indicating that the light rays emitted by the third light array emitter 312a are not obstructed (as shown by arrow 512). Based on the third trigger signal from the third set of light array sensors 312, the first controller 206 may determine that it is safe to operate the first and second conveyors 402a and 402b.

The first controller 206 may communicate a second request to the first set of image-capturing sensors 306, requesting the first set of image-capturing sensors 306 to scan identifiers (e.g., the first and second identifiers) of the first and second packages (as shown by arrow 514). Based on the second request, the first set of image-capturing sensors 306 may scan the first and second identifiers and communicate sensor data, indicative of the first and second identification codes of the first and second packages, to the first controller 206 (as shown by arrow 516). The first and second packages are of the first package type (i.e., the first and second packages are small packages). When placed correctly, neither the first package, nor the second package, may obstruct the light rays emitted by the second light array emitter 310a. Therefore, the first controller 206 may receive sensor data (e.g., the first DI signal having a value equal to '0') from the second set of light array sensors 310, indicating an absence of a large package (e.g., a package of the second package type) on the first and second conveyors 402a and 402b (as shown by arrow 518). Based on the first and second identification codes and the sensor data from the second set of light array sensors 310, the first controller 206 may determine that two packages (such as the first and second packages) of the first package type are placed on the first and second conveyors 402a and 402b. Based on the determination, the first controller 206 may communicate first and second move commands to the first and second VFDs 304a and 304b, respectively (as shown by arrows 520 and 522). The first and second move commands may be indicative of a first speed and a second speed to be maintained by the first and second conveyors 402a and 402b, respectively. The first controller 206 may determine the first speed and the second speed based on at least the first and second weights of the first and second packages. In other words, the first speed and the second speed may be determined based on at least the first weight and the second weight borne by the first and second conveyors 402a and 402b, respectively. The first and second VFDs 304a and 304b may operate the first and second motors 302a and 302b based on the first and second move commands, respectively.

The first and second motors 302a and 302b may run the first and second conveyors 402a and 402b based on input voltage and input frequency signals provided by the first and second VFDs 304a and 304b. The first and second VFDs 304a and 304b may provide the input voltage and input frequency signals based on the first and second move commands. The first speed and the second speed may be equal or unequal. In a non-limiting example, it is assumed that the first speed and the second speed are equal. As the first and second packages are being conveyed, simultaneously, by the first and second conveyors 402a and 402b to the third conveyor 402c, the first set of ultrasonic sensors 202 may communicate, to the first controller 206, sensor data indicative of the first height of the first package and the second height of the second package (as shown by arrow 524). As described in the foregoing description of FIG. 2, the first controller 206 may determine the first and second heights of the first and second packages, based on sensor data from the first set of ultrasonic sensors 202. The first set of light array sensors 204 may communicate, to the first controller 206, sensor data that is indicative of light rays obstructed by each of the first and second packages (as shown by arrow 526). The sensor data, received from the first set of light array sensors 204, may further indicate a time duration for which each light ray is obstructed. As described in the foregoing, the first controller 206 may determine the first dimensions (i.e., the first length, width, and height) and the second dimensions (e.g., the second length, width, and height) of the first and second packages (as shown by arrow 528). Based on the sensor data received from the first set of light array sensors 204, the first controller 206 may further determine the first relative position of the first package on the first conveyor 402a and a second relative position of the second package on the second conveyor 402b.

The first controller 206 may utilize the first and second relative positions to determine first and second correction factors for determining actual heights of the first and second packages. In a non-limiting example, it is assumed that the actual heights of the first and second packages are equal to the first and second heights, respectively. Based on at least one of the first and second lengths, widths, and heights, and the first and second weights, the first controller 206 may communicate a third move command to the third VFD 304c (as shown by arrow 530). The third move command may be indicative of a third speed to be maintained by the third conveyor 402c. The third speed may be determined such that a speed (e.g., the first speed) of the first package and a speed (e.g., the second speed) of the second package remain constant when the first and second packages are conveyed, across the first light array emitter 204a, from the first and second conveyors 402a and 402b to the third conveyor 402c. The first controller 206 may communicate at least one of the first and second dimensions, the first and second volumes, and the first and second identification codes to the CS 112 (as shown by arrow 532).

In one embodiment, the CS 112 may identify transport vehicles that are available for transporting the first and second packages. The CS 112 may then select the first transport vehicle 110a from the available transport vehicles to transport the first and second packages to the first and second locations. The CS 112 may select the first transport vehicle 110a based on a distance between the current location of the first transport vehicle 110a, an estimated time of arrival for the first transport vehicle 110a to reach the location of the first induction station 106a, or the like. In one embodiment, the CS 112 may select the first transport vehicle 110a further based on at least one of the package type of each of the first and second packages, the first and second dimensions, the first and second weights, the first and second package details, or the like. The CS 112 may communicate, to the first transport vehicle 110a, instructions to transport the first and second packages from the third conveyor 402c to the first and second locations. The instructions may be indicative of a first optimal path to be traversed by the first transport vehicle 110a to reach the location of the first induction station 106a (e.g., a location of the third conveyor 402c) from the current location of the first transport vehicle 110a.

The instructions may be further indicative of a second optimal path to be traversed by the first transport vehicle 110a to reach the first and second locations from the location of the first induction station 106a. The first and second optimal paths may be defined in terms of fiducial markers (e.g., $FM_1$ and $FM_2$) that need to be traversed by the first transport vehicle 110a. The first transport vehicle 110a may reach the first induction station 106a and approach the third conveyor 402c by following the first optimal path (as shown by arrow 534). In one embodiment, the first speed and the second speed may be further determined based on a throughput (e.g., number packages inducted per unit time) required of the first induction station 106a. For example, when a higher throughput is required, the first speed and the second speed may be increased. The first speed and the second speed may be further determined based on the distances between the first induction station 106a and the current locations of the first and second transport vehicles 110a and 110b, estimated time of arrivals of the first and second transport vehicles 110a and 110b to reach the first induction station 106, or the like. For example, the first speed and the second speed may be reduced or increased to match a time instant at which the first and second packages are conveyed to the third conveyor 402c and time instants of arrival of the first and second transport vehicles 110a and 110b.

The first induction station 106a may further include a fourth set of light array sensors. The fourth set of light array sensors may enable the first controller 206 to determine a proximity of a transport vehicle (e.g., the first transport vehicle 110a) to the third conveyor 402c, based on sensor data received by the first controller 206 from the fourth set of light array sensors. The first controller 206 may determine the proximity of the first transport vehicle 110a to the third conveyor 402c (as shown by arrow 536). In one embodiment, if the first controller 206 determines that the first transport vehicle 110a has not approached the third conveyor 402c, the first controller 206 may halt the first conveyor 402a, the second conveyor 402b, or the third conveyor 402c until the first transport vehicle 110a approaches the third conveyor 402c. For example, the first controller 206 may modulate the first speed, the second speed, and the third speed based on operational requirements. In another embodiment, when the first controller 206 determines that the first transport vehicle 110a has approached the third conveyor 402c, the first controller 206 may communicate with the CS 112 to synchronize the third speed and a speed of a conveyor of the first transport vehicle 110a to enable a smooth conveying of the first and second packages to the first transport vehicle 110a from the third conveyor 402c. The first controller 206 may communicate a fourth speed control command to the third VFD 304c for synchronizing the third speed and a speed of the conveyor of the first transport vehicle 110a (as shown by arrow 538). Based on the fourth speed control command, the third VFD 304c may control the third speed, by varying an input frequency and an input voltage to the third motor 302c. The first and second packages may be conveyed from the third conveyor 402c to the first transport vehicle 110a. The first transport vehicle 110a may receive the first and second packages from the third conveyor 402c and may transport the first and second packages to the first and second locations (as shown by arrow 540). In another embodiment, the first and second operators 108a and 108b may place more packages on the first induction station 106a for sortation, while the first and second packages are on the third conveyor 402c. The first and second packages may be stationary on the third conveyor 402c until the first transport vehicle 110a arrives to receive the first and second packages from the third conveyor 402c.

In another embodiment, the first operator 108a may place the first package on the first conveyor 402a before placing the second package. In such a scenario, the first set of weight sensors 308 may communicate sensor data to the first controller 206, indicating that the first conveyor 402a is carrying a load equal to the first weight. In such a scenario, the first controller 206 may communicate a request to the first set of image-capturing sensors 306, requesting the first set of image-capturing sensors 306 to scan the first package for the first identifier. Based on the request, the first set of image-capturing sensors 306 may scan the first identifier of the first package, decode the first identifier, and communicate the first identification code to the first controller 206. The first controller 206 may wait for a short duration for the first operator 108a to place another package (e.g., the second package) on the second conveyor 402b. When the first operator 108a places the second package on the second package on the second conveyor 402b, the first controller 206 may communicate another request to the first set of image-capturing sensors 306, requesting the first set of image-capturing sensors 306 to scan the second identifier of the second package. Based on the request, the first set of image-capturing sensors 306 may scan the second identifier of the second package, decode the second identifier and communicate the second identification code to the first controller 206. Consequently, the first controller 206 may issue the first and second move commands to the first and second VFDs 304a and 304b, respectively.

In another embodiment, the first identification code may be indicative of one or more properties of the first package. For example, the first identification code may indicate that the first package is fragile. Based on the first identification code, the first controller 206 may decrease the first speed and/or the third speed to ensure that the first package is safely conveyed across the first and second packages.

In another embodiment, the first operator 108a may mistakenly place the first and second packages on the same conveyor (e.g., the first conveyor 402a). In such a scenario, sensor data from the first set of weight sensors 308 may indicate that the first conveyor 402a bears a weight equal to a sum of the first and second weights. The sensor data from the first set of weight sensors 308 may further indicate that no packages are placed on the second conveyor 402b. Sensor data from the first set of image-capturing sensors 306 may indicate two identification codes (e.g., the first and second identification codes). Based on the sensor data from the first set of image-capturing sensors 306 and the first set of weight sensors 308, the first controller 206 may determine that the first operator 108a has placed two packages on the first conveyor 402a. Consequently, the first controller 206 may display a message on the first UI on the first display 208, indicating an error and requesting the first operator 108a to place the first and second packages on the respective first and second conveyors 402a and 402b. The first controller 206 may further communicate the first DO signal having a value equal to '1' to the first visual indicator 314. The first visual indicator 314 may display the second visual signal, based on the first DO signal.

In another embodiment, the first operator 108a may place the first and second packages on the first and second conveyors 402a and 402b haphazardly such that one or more light rays emitted by the second light array emitter 310a are obstructed by the first package. In such a scenario, sensor data (i.e., the first DI signal) from the second set of light array sensors 310 may indicate a presence of a package of the second package type on the first and second conveyors 402a and 402b. However, sensor data from the first set of image-capturing sensors 306 may indicate two identification codes (e.g., the first and the second identification codes). Based on the sensor data from the first set of image-capturing sensors 306 and the second set of light array sensors 310, the first controller 206 may determine that the first operator 108a has placed the packages incorrectly. Consequently, the first controller 206 may display a message on the first UI on the first display 208, indicating an error and requesting the first operator 108a to correctly place the first and second packages on the first and second conveyors 402a and 402b or remove one of the first and second packages from the first induction station 106a. The first controller 206 may further communicate the first DO signal having a value equal to '1' to the first visual indicator 314 and the first visual indicator 314 may display the second visual signal.

FIGS. 6A and 6B are block diagrams 600A and 600B that illustrate top and side views, respectively, of the first induction station 106a, in accordance with an embodiment of the present disclosure. The block diagram 600A illustrates the first set of image-capturing sensors 306 and first and second load cells (hereinafter, the first and load cells are referred to as 'the first and second load cells 602a and 602b'). The block diagram 600A further illustrates the first light array emitter 204a, the first set of ultrasonic sensors 202, the second light array emitter 310a, the third light array emitter 312a, and the first through third conveyors 402a-402c. The block diagram 600B illustrates the first set of image-capturing sensors 306, the second load cell 602b, the first set of light array sensors 204, and the third set of light array sensors 312. The block diagram 600B further illustrates the second and third conveyors 402b and 402c. The block diagram 600B illustrates the second load cell 602b installed within the second conveyor 402b. In another example, the second load cell 602b may be installed below the second conveyor 402b. It will be apparent to those of skill in the art that the first load cell 602a may be installed within or below the first conveyor 402a in a similar manner.

FIGS. 7A and 7B are block diagrams 700A and 700B that illustrate top and side views, respectively, of the first induction station 106a at a first time instance 't=$t_0$', in accordance with an embodiment of the present disclosure. The block diagrams 700A and 700B have been described in conjunction with FIGS. 5A-5C. The block diagrams 700A and 700B illustrate the top and side views of the first induction station 106a at the first time instance 't=$t_0$'. In a non-limiting example, at the first time instance 't=$t_0$', the first operator 108a has placed the first and second packages (hereinafter, the first and second packages are referred to as 'the first and second packages 702 and 704') on the first and second conveyors 402a and 402b.

FIGS. 7C and 7D are block diagrams 700C and 700D that illustrate top and side views, respectively, of the first induction station 106a at a second time instance 't=$t_1$' ($t_1 > t_0$), in accordance with an embodiment of the present disclosure. The block diagrams 700C and 700D have been described in conjunction with FIGS. 5A-5C. The block diagrams 700C and 700D illustrate the top and side views of the first induction station 106a at the second time instance 't=$t_1$'. In a non-limiting example, at the second time instance 't=$t_1$', the first and second packages 702 and 704 are being conveyed from the first and second conveyors 402a and 402b, respectively, to the third conveyor 402c, across the first light array emitter 204a (as described in the foregoing description of FIG. 5B).

Figure 7E:
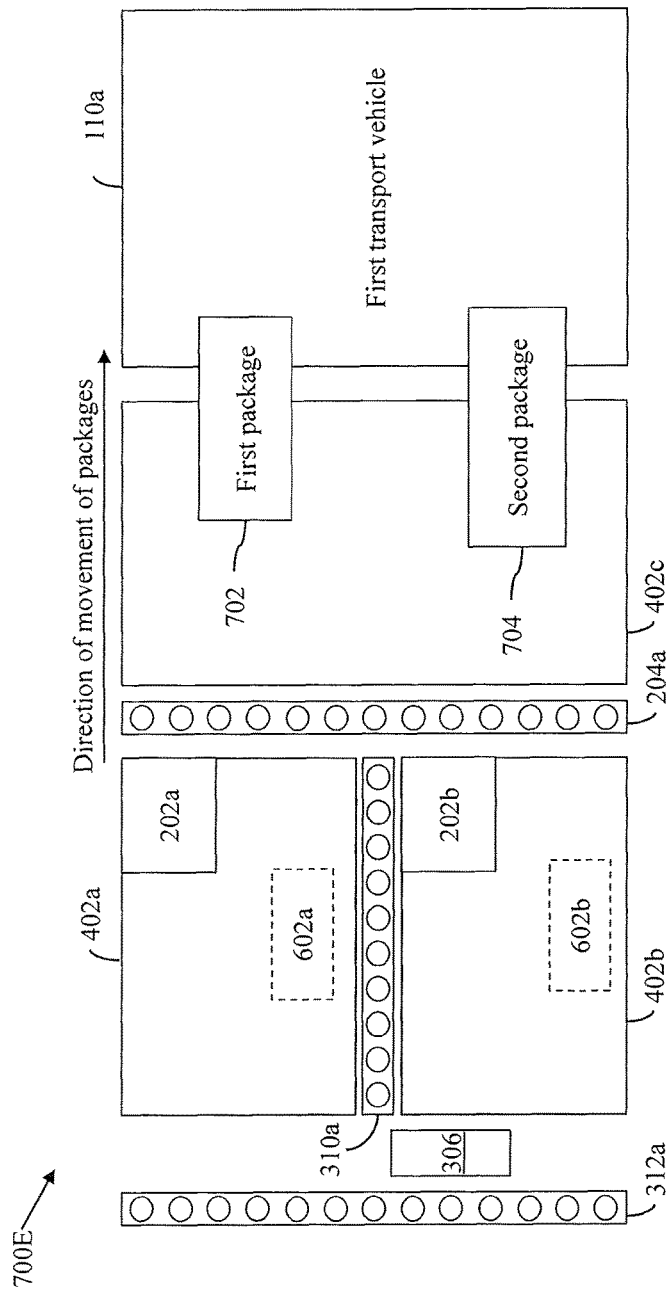
FIGS. 7E and 7F are block diagrams that illustrate top and side views, respectively, of the induction station at a third time instance 't=$t_2$', in accordance with an embodiment of the present disclosure.
Figure 7F:
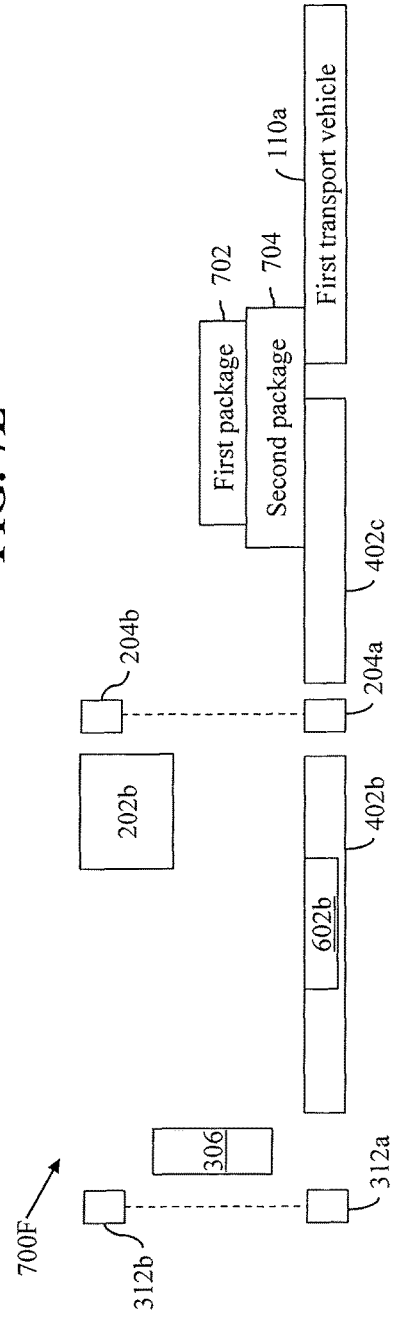

FIGS. 7E and 7F are block diagrams 700E and 700F that illustrate top and side views, respectively, of the first induction station 106a at a third time instance 't=$t_2$', in accordance with an embodiment of the present disclosure. The block diagrams 700C and 700D have been described in conjunction with FIGS. 5A-5C. The block diagrams 700E and 700F illustrate the top and side views of the first induction station 106a at the third time instance 't=$t_2$'. In a non-limiting example, at the third time instance 't=$t_2$', the first and second packages 702 and 704 are being conveyed from the third conveyor 402c to the first transport vehicle 110a (as described in the foregoing descriptions of FIGS. 5B and 5C).

Figure 8A:
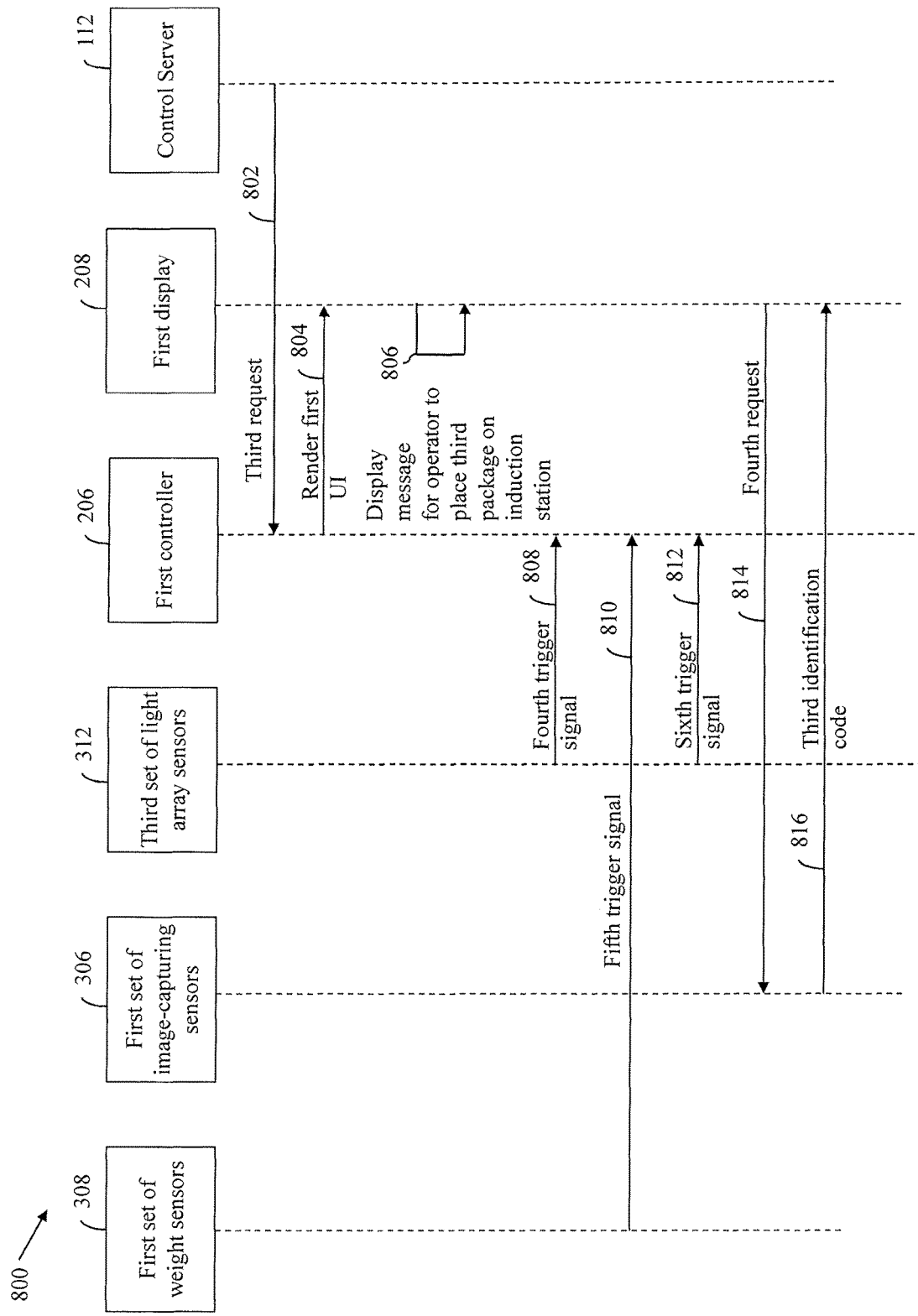
FIGS. 8A-8C are diagrams that collectively illustrate an exemplary process flow for conveying a third package, in accordance with an embodiment of the present disclosure.
Figure 8B:
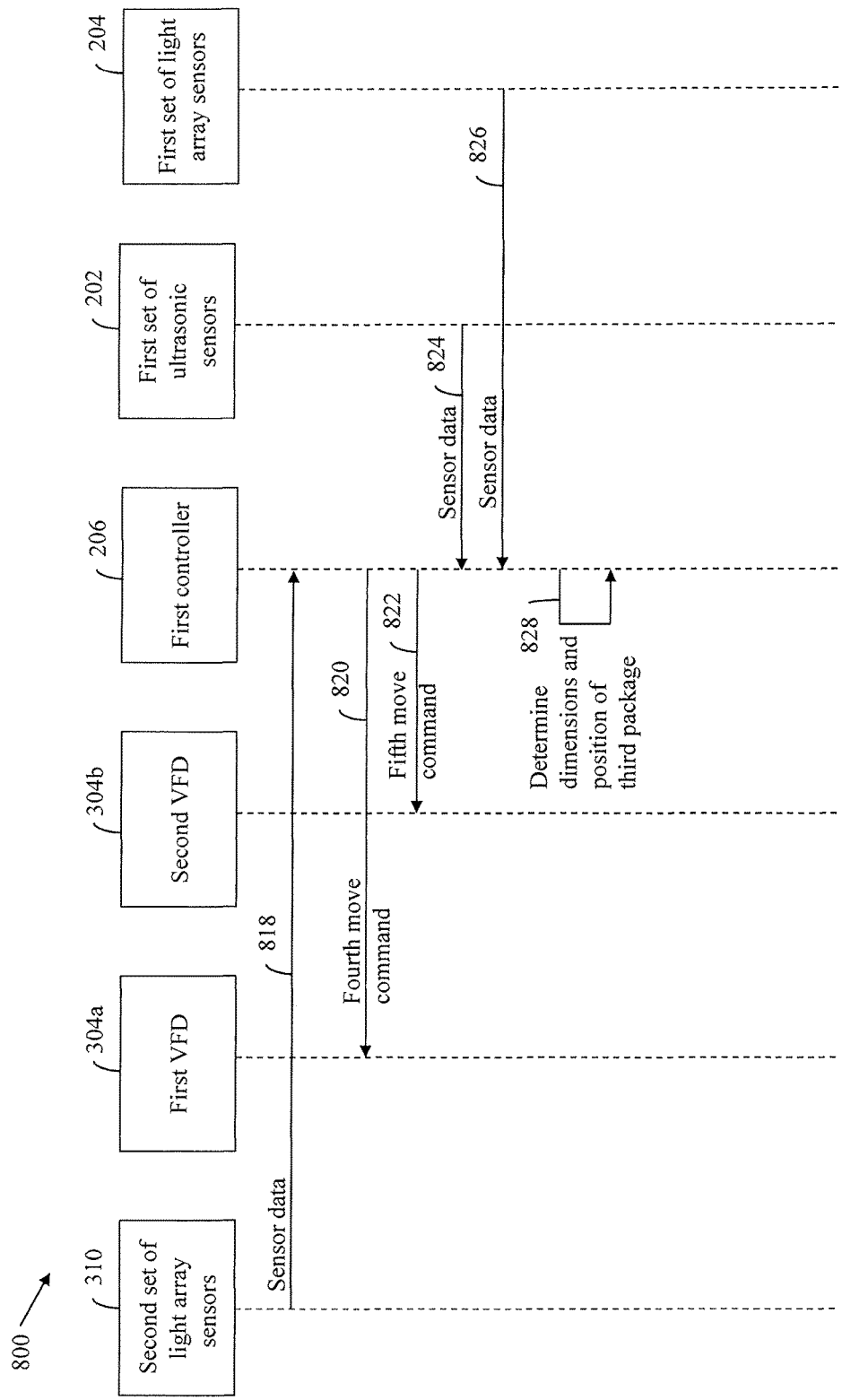
Figure 8C:
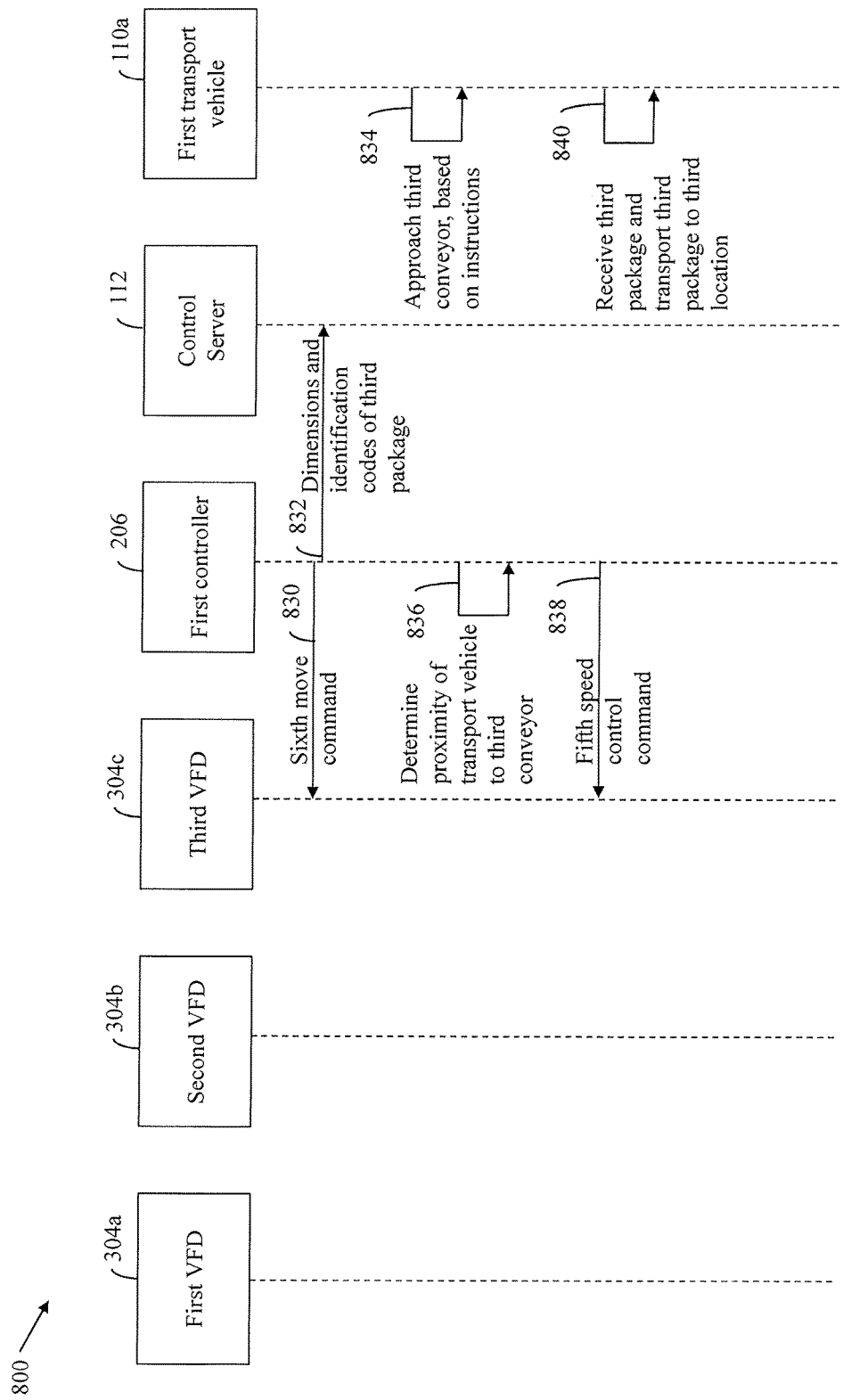

FIGS. 8A-8C are diagrams that collectively illustrate an exemplary process flow 800 for conveying the third package, in accordance with an embodiment of the present disclosure. The exemplary scenario 800 involves the first transport vehicle 110a, the CS 112, the first set of ultrasonic sensors 202, the first set of light array sensors 204, the first controller 206, the first display 208, the first display 208, the VFDs 304, the first set of image-capturing sensors 306, the first set of weight sensors 308, the second set of light array sensors 310, and the third set of light array sensors 312.

The CS 112 may receive, from the external server or an entity, a second service request for placing the third package in the storage facility 102. Based on the second service request, the CS 112 may identify an induction station (e.g., the first induction station 106a) for performing an operation (e.g., sortation of the third package for placing in the storage facility 102) corresponding to the first service request. Based on the second service request, the first controller 206 may identify an induction station (e.g., the first induction station 106a) for handling the second service request. Based on the second service request, the CS 112 may communicate a third request to the first controller 206 (as shown by arrow 802). The third request may be request for the first operator 108a to place the third package on the first induction station 106a for sortation. Based on the third request, the first controller 206 may render the first UI on the first display 208 (as shown by arrow 804). The first UI may present, to the first operator 108a, a second message instructing the first operator 108a to place packages such as the third package on the first induction station 106a (as shown by arrow 806). In a non-limiting example, the first operator 108a may place the third package on the first and second conveyors 402a and 402b. When the first operator 108a places the third package on the first and second conveyors 402a and 402b, one or more light rays emitted by the third light array emitter 312a may be obstructed by one or more body parts (e.g., hands) of the first operator 108a. Based on the obstruction of the one or more light rays, the third set of light array sensors 312 may communicate a fourth trigger signal (e.g., the second DI signal having a value equal to '1') to the first controller 206, indicating that the first operator 108a is in close proximity to the first and second conveyors 402a and 402b (as shown by arrow 808). To ensure the safety of the first operator 108a, the first controller 206 may communicate the first and second stop commands to the first and second VFDs 304a and 304b, respectively, based on the second DI signal. Based on the first and second stop commands, the first and second VFDs 304a and 304b may stop the first and second motors 302a and 302b, immobilizing the first and second conveyors 402a and 402b.

When the first operator 108a places the third package on the first and second conveyors 402a and 402b, the first set of weight sensors 308 (e.g., the first and second weight controllers) may communicate a fifth trigger signal to the first controller 206 (as shown by arrow 810). The fifth trigger signal may include sensor data of the first set of weight sensors 308 that may indicative of a load on each of the first and second conveyors 402a and 402b. For example, the sensor data from the first set of weight sensors 308 may be indicative of a weight distribution of the third weight on each of the first and second conveyors 402a and 402b. After placing the third package on the first and second conveyors 402a and 402b, the first operator 108a may move away from the first induction station 106a. Consequently, the one or more light rays emitted by the third light array emitter 312a may not obstructed. As a result, the value of the second DI signal may be equal to '0'. The first controller 206 may receive a sixth trigger signal (i.e., the second DI signal having the value equal to '0') from the third set of light array sensors 312, indicating that the light rays emitted by the third light array emitter 312a are not obstructed (as shown by arrow 812). Based on the sixth trigger signal from the third set of light array sensors 312, the first controller 206 may determine that it is safe to operate the first and second conveyors 402a and 402b.

The first controller 206 may communicate a fourth request to the first set of image-capturing sensors 306, requesting the first set of image-capturing sensors 306 to scan an identifier of each package on the first and second conveyors 402a and 402b (as shown by arrow 814). Based on the third request, the first set of image-capturing sensors 306 may scan the third identifier of the third package and communicate sensor data, indicative of a third identification code, to the first controller 206. The first set of image-capturing sensors 306 may communicate sensor data, indicative of the third identification code, to the first controller 206 (as shown by arrow 816). The third package is of the second package type (e.g., the third package is a large package). The third package may occupy the first and second portions of the first and second conveyors 402a and 402b. The third package may obstruct one or more light rays emitted by the second light array emitter 310a. Therefore, the first controller 206 may receive sensor data (e.g., the first DI signal having a value equal to '1') from the second set of light array sensors 310, indicating a presence of a large package (e.g., a package of the second package type) on the first and second conveyors 402a and 402b (as shown by arrow 818). Based on the third identification code and the sensor data from the second set of light array sensors 310, the first controller 206 may determine that a single package of the second package type is placed on the first and second conveyors 402a and 402b. Based on this determination, the first controller 206 may communicate fourth and fifth move commands to the first and second VFDs 304a and 304b, respectively (as shown by arrows 820 and 822). The fourth and fifth move commands may be indicative of a first speed and a second speed to be maintained by the first and second conveyors 402a and 402b, respectively. The first controller 206 may determine the first speed and the second speed based on the weight distribution of the third weight across the first and second portions of the first and second conveyors 402a and 402b. In a non-limiting example, the third weight is evenly distributed across the first and second portions. In other words, the first speed and the second speed are synchronized based on the detection of the package type of the third package as the second package type. The first speed and the second speeds may be synchronized to prevent a displacement of the third package from a relative position of the third package on the first and second conveyors 402a and 402b. The first and second VFDs 304a and 304b may operate the first and second motors 302a and 302b based on the first and second move commands, respectively.

The first and second motors 302a and 302b may run the first and second conveyors 402 and 402b based on input voltage and input frequency signals provided by the first and second VFDs 304a and 304b. The first and second VFDs 304a and 304b may provide the input voltage and input frequency signals based on the fourth and fifth move commands. In another embodiment, if the third weight is unevenly distributed across the first and second portions, the first and second VFDs 304a and 304b may vary the input voltage and input frequency signals to the first and second motors 302a and 302b so that first and second conveyors 402a and 402b move at a same speed. For example, the first speed and the second speed are synchronized. In a non-limiting example, it is assumed that the first speed and the second speed are equal. As the third package is being conveyed by the first and second conveyors 402a and 402b to the third conveyor 402c, the first set of ultrasonic sensors 202 may communicate, to the first controller 206, sensor data indicative of a third height of the third package (as shown by arrow 824). The first controller 206 may determine the third height of the third package, based on the sensor data from the first set of ultrasonic sensors 202. The first set of light array sensors 204 may communicate, to the first controller 206, sensor data that is indicative of light rays obstructed by the third package (as shown by arrow 826).

The sensor data, received from the first set of light array sensors 204, may further indicate a duration for which light ray is obstructed. As described in the foregoing, the first controller 206 may determine third dimensions (the third height, a third length, and a third width) of the third package (as shown by arrow 828). Based on the third dimensions, the first controller 206 may further determine a third volume of the third package. Based on the sensor data received from the first set of light array sensors 204, the first controller 206 may further determine a third relative position of the third package on the first and second conveyors 402a and 402b. The first controller 206 may utilize the third relative position to determine a third correction factor for determining an actual height of the third package. In a non-limiting example, it is assumed that the actual height of the third package is the same as the third height. Based on the third dimensions and/or the third weight, the first controller 206 may communicate a sixth move command to the third VFD 304c (as shown by arrow 830). The sixth move command may be indicative of a third speed to be maintained by the third conveyor 402c. The third speed may be determined such that a speed (i.e., the third speed) of the third package on the first and second conveyors 402a and 402b remains constant when the third package is conveyed, across the first light array emitter 204a, from the first and second conveyors 402a and 402b to the third conveyor 402c. The first controller 206 may communicate at least one of the third dimensions, the third volume, and the third identification code to the CS 112 (as shown by arrow 832).

The CS 112 may select one or more transport vehicle (e.g., the first transport vehicle 110a) for transporting the third package to the third location in the storage area 104. In one embodiment, the CS 112 may select the one or more transport vehicles based on the third dimensions, the third package details, a proximity of the selected one or more transport vehicles to the first induction station 106a, a distance between the third location and the location of the first induction station 106a, or the like. The third location may correspond to the ISUs 116. The first controller 206 may communicate, to the first transport vehicle 110a, instructions to transport the third package from the third conveyor 402c to the third package. The instructions may be indicative of a third optimal path to be traversed by the first transport vehicle 110a to reach the location of the first induction station 106a (e.g., a location of the third conveyor 402c) from a current location of the first transport vehicle 110a. The instructions may further be indicative of a fourth optimal path to be traversed by the first transport vehicle 110a to reach the third location from the location of the first induction station 106a. The third and fourth optimal paths may be defined in terms of fiducial markers (e.g., $FM_1$ and $FM_2$) that need to be traversed by the first transport vehicle 110a. The first transport vehicle 110a may approach the third conveyor 402c by following the third optimal path (as shown by arrow 834).

The first controller 206 may determine the proximity of the first transport vehicle 110a to the third conveyor 402c (as shown by arrow 836). In one embodiment, if the first controller 206 determines that the first transport vehicle 110a has not approached the third conveyor 402c, the first controller 206 may halt the first conveyor 402a, the second conveyor 402b, or the third conveyor 402c until the first transport vehicle 110a approaches the third conveyor 402c. In another embodiment, if the first controller 206 determines that the first transport vehicle 110a has approached the third conveyor 402c, the first controller 206 may communicate with the CS 112 to synchronize the third speed and a speed of a conveyor of the first transport vehicle 110a to enable a smooth conveying of the third package to the first transport vehicle 110a from the third conveyor 402c. The first controller 206 may communicate a fifth speed control command to the third VFD 304c for synchronizing the third speed and a speed of the conveyor of the first transport vehicle 110a (as shown by arrow 838). Based on the fifth speed control command, the third VFD 304c may control the third speed, by varying an input frequency and an input voltage to the third motor 302c. The third package may be conveyed from the third conveyor 402c to the first transport vehicle 110a. The first transport vehicle 110a may receive the third package from the third conveyor 402c and may transport the third package to the third location using the fourth optimal path (as shown by arrow 840).

Figure 9:
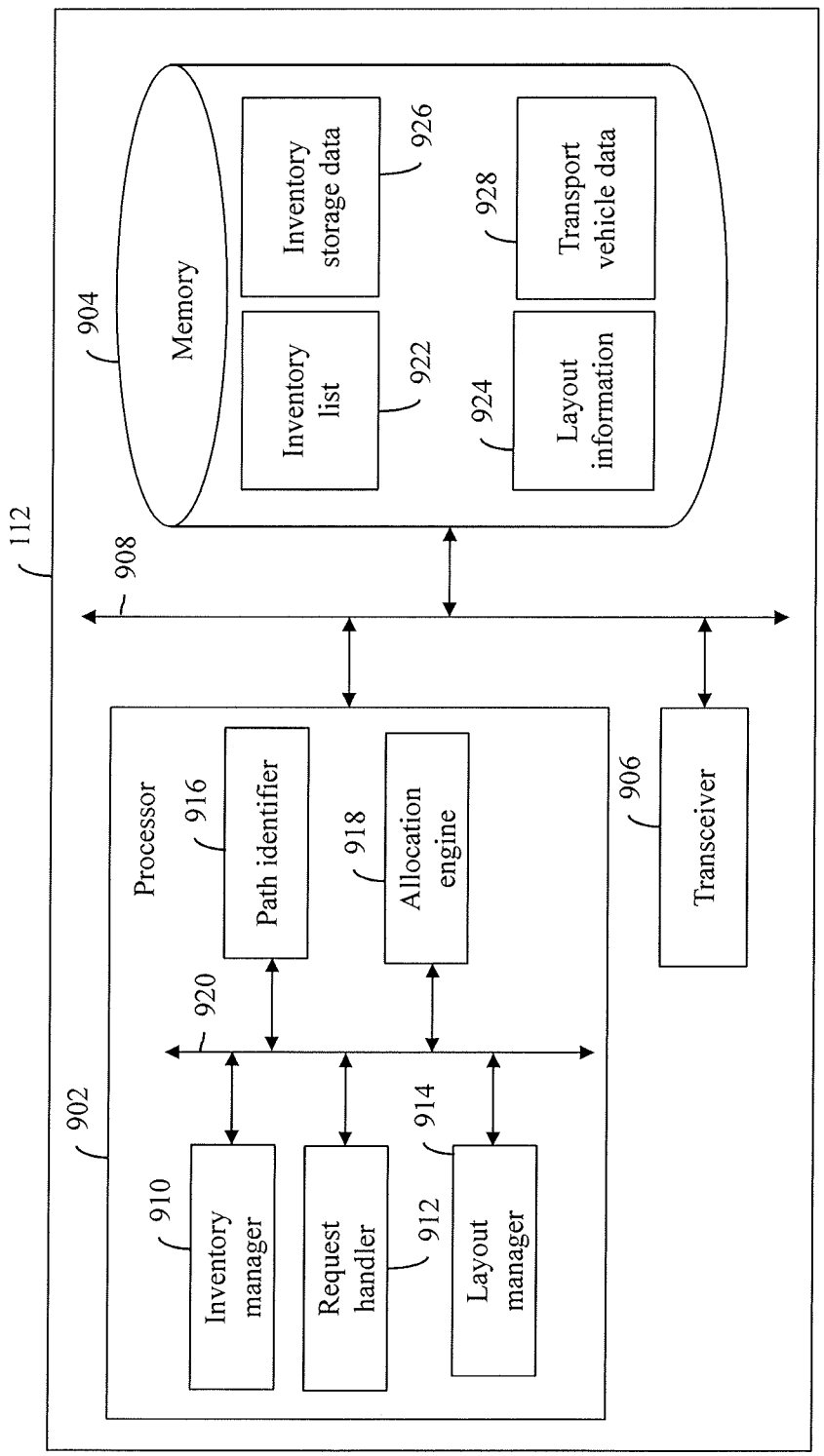
FIG. 9 is a block diagram that illustrates a control server of FIG. 1, in accordance with an embodiment of the present disclosure.

FIG. 9 is a block diagram that illustrates the CS 112, in accordance with an embodiment of the present disclosure. The CS 112 may include a processor 902, a memory 904, and a transceiver 906 that communicate with each other by way of a first communication bus 908. The processor 902 may include an inventory manager 910, a request handler 912, a layout manager 914, a path identifier 916, and an allocation manager 918 that communicate with each other by way of a second communication bus 920. It will be apparent to a person having ordinary skill in the art that the CS 112 is for illustrative purposes and not limited to any specific combination or hardware circuitry and/or software.

The processor 902 may include suitable logic, instructions, circuitry, interfaces, and/or code for executing various operations, such as inventory or storage facility management operations, procurement operations, or the like. Examples of the processor 902 may include, but are not limited to, an application-specific integrated circuit (ASIC) processor, a reduced instruction set computing (RISC) processor, a complex instruction set computing (CISC) processor, a field-programmable gate array (FPGA), and the like. The processor 902 may execute the inventory management operations, such as identifying induction stations (e.g., the first induction station 106a) for sortation of packages (e.g., the first through third packages), selecting transport vehicles (e.g., the transport vehicles 110) for transporting the packages, and determining optimal paths (and determining service requirements of the transport vehicles 110 (as described in the foregoing descriptions of FIGS. 5A-5C and 8A-8C).

The memory 904 may include suitable logic, instructions, circuitry, interfaces, and/or code to store an inventory list 922, layout information 924, the inventory storage data (hereinafter, referred to as 'the inventory storage data 926'), and transport vehicle data 928. Examples of the memory 904 include a random-access memory (RAM), a read-only memory (ROM), a removable storage drive, a hard disk drive (HDD), a flash memory, a solid-state memory, and the like. In one embodiment, the memory 904 may be realized through various database technologies such as, but not limited to, Microsoft® SQL, Oracle®, IBM DB2®, Microsoft Access®, PostgreSQL®, MySQL® and SQLite®. It will be apparent to a person skilled in the art that the scope of the disclosure is not limited to realizing the memory 904 in the CS 112, as described herein. In other embodiments, the memory 904 may be realized in form of an external database server or a cloud storage working in conjunction with the CS 112, without departing from the scope of the disclosure.

The inventory list 922 may include a list of packages stored in the storage facility 102. The layout information 924 may include the virtual map of the storage facility 102. The virtual map may include information pertaining to the layout of the storage facility 102, such as the locations of the fiducial markers. The layout information 924 may further include an association between the fiducial markers and the ISUs 116. The layout information 924 may indicate real-time locations of the ISUs 116 based on the ISU markers. The layout information 924 may further include real-time path availability information of various paths in the storage facility 102. For example, the layout information 924 may indicate that one or more paths (such as the aisles 118) are closed down for maintenance.

The inventory storage data 926 may be indicative of the associations between packages (e.g., the first through third packages) and the ISUs 116. The inventory storage data 926 may include details of packages stored in each of the ISUs 116. As described in the foregoing, each ISU 116 may be associated with a ISU marker. Based on the inventory storage data 926, the CS 112 may be aware of the storage locations of the inventory items stored in the ISUs 116. The transport vehicle data 928 may be indicative of details of the transport vehicles 110. The details of each of the first and second transport vehicles 110a and 110b may include a size, dimensions, a load carrying capacity, a maximum and minimum speed, an identifier (such as a numeric or an alpha-numeric code) associated with a corresponding transport vehicle, or the like. The details of each of the first and second transport vehicles 110a and 110b may further include real-time information, such as a real-time location, an indicator that indicates whether a corresponding transport vehicle is carrying a package, or the like.

The transceiver 906 may transmit and receive data over the communication network 114 using one or more communication network protocols. The transceiver 906 may transmit various requests and messages to the transport vehicles 110 and the induction stations 106 and receives requests and messages from the transport vehicles 110 and the induction stations 106. Examples of the transceiver 906 may include, but are not limited to, an antenna, a radio frequency transceiver, a wireless transceiver, a Bluetooth transceiver, an ethernet based transceiver, a USB transceiver, or any other device configured to transmit and receive data.

The processor 902 may execute the inventory management operations by way of the inventory manager 910, the request handler 912, the layout manager 914, the path identifier 916, and the allocation manager 918. The inventory manager 910 may manage the inventory list 922 stored in the memory 904. For example, the inventory manager 910 add new packages to the inventory list 922 when the new packages are stored in the storage area 104 and may update the inventory list 922 whenever there is any change in regards to the packages stored in the storage area 104.

The request handler 912 may process all service requests (e.g., the first and second service requests) received from the external communication server. The request handler 912 may identify, based on the service requests received from the external communication server, packages and induction stations pertinent to the service requests. The request handler 912 may further identifies ISUs for storing the packages associated with the service requests. The request handler 912 may further communicate requests (e.g., the first request) to the first controller 206, based on the service requests.

The layout manager 914 may manage the layout information 924. For example, if there is any change in the layout of the storage facility 102 (such as a change in the arrangement of the ISUs 116), the layout manager 914 may update the layout information 924 based on the change in the layout. The path identifier 916 may be configured to determine optimal paths (such as the first through fourth optimal paths). The allocation manager 918 may handle selection of transport vehicles (e.g., the first and second transport vehicles 110a and 110b) for transporting the packages. For example, the allocation manager 918 may determine that the first transport vehicle 110a is available to transport the first and second packages 702 and 704 and may select the first transport vehicle 110a for transporting the first and second packages 702.

Figure 10:
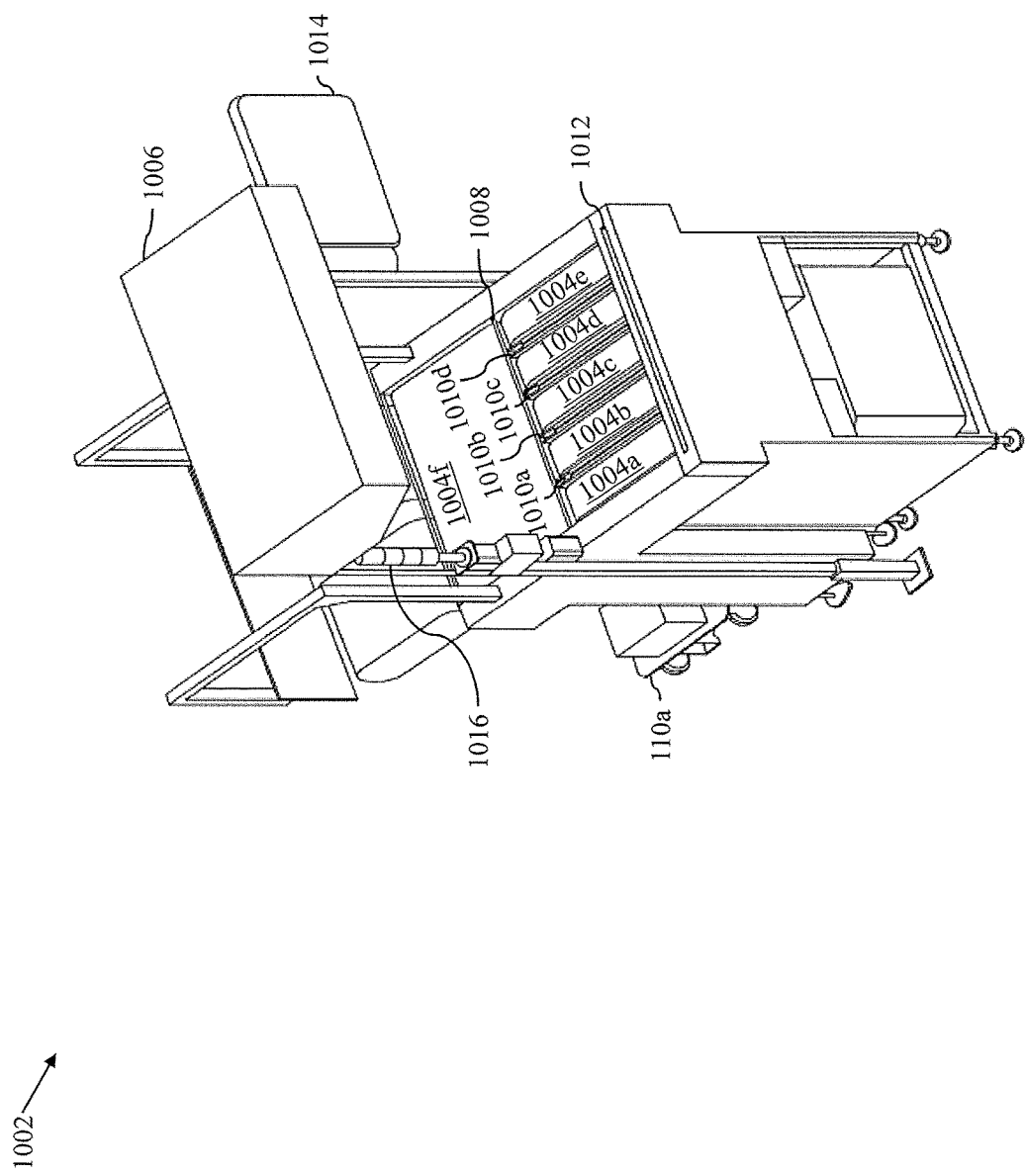
FIG. 10 is a diagram that illustrates a 3D representation of an induction station, in accordance with another embodiment of the present disclosure.

FIG. 10 is a diagram that illustrates a 3D representation of a third induction station 1002, in accordance with another embodiment of the present disclosure. As shown in FIG. 10, the third induction station 1002 includes a plurality of feed conveyors such as fourth through eighth conveyors 1004a-1004e that are parallel to each other. The third induction station 1002 further includes one or more buffer conveyors such as a ninth conveyor 1004f. The third induction station 1002 further includes a second canopy 1006. It will be apparent to those of skill in the art that the second canopy 1006 may be similar to the first canopy 404. The second canopy 1006 may be at a sixth pre-determined height above the fourth through eighth conveyors 1004a-1004e. An ultrasonic sensor above each of the fourth through eighth conveyors 1004a-1004e, on a bottom side of the second canopy 1006. In FIG. 10, there is further a fifth light array emitter 1008a, sixth through ninth light array emitters 1010a-100d, a tenth light array emitter 1012, a second display 1014, and a second visual indicator 1016. A fifth light array receiver corresponding to the fifth light array emitter 1008a, sixth through ninth light array receivers corresponding to sixth through ninth light array emitters 1010a-100d, and a tenth light array receiver corresponding to the tenth light array emitter 1012 may be installed on the bottom side of the canopy. The fifth light array emitter 1008a may be functionally similar to the first light array emitter 204a, the sixth through ninth light array emitters 1010a-1010d may be functionally similar to the second light array emitter 310a, and the tenth light array emitter 1012 may be similar to the third light array emitter 312a. The second display 1014 and the second visual indicator 1016 may be similar to the first display 208 and the first visual indicator 314, respectively. It will be apparent to a person of skill in the art that the third induction station 1002 is functionally similar to the first and second induction stations 106a and 106b, and has more package handling capacity as compared to the first and second induction stations 106a and 106b.

Figure 11:
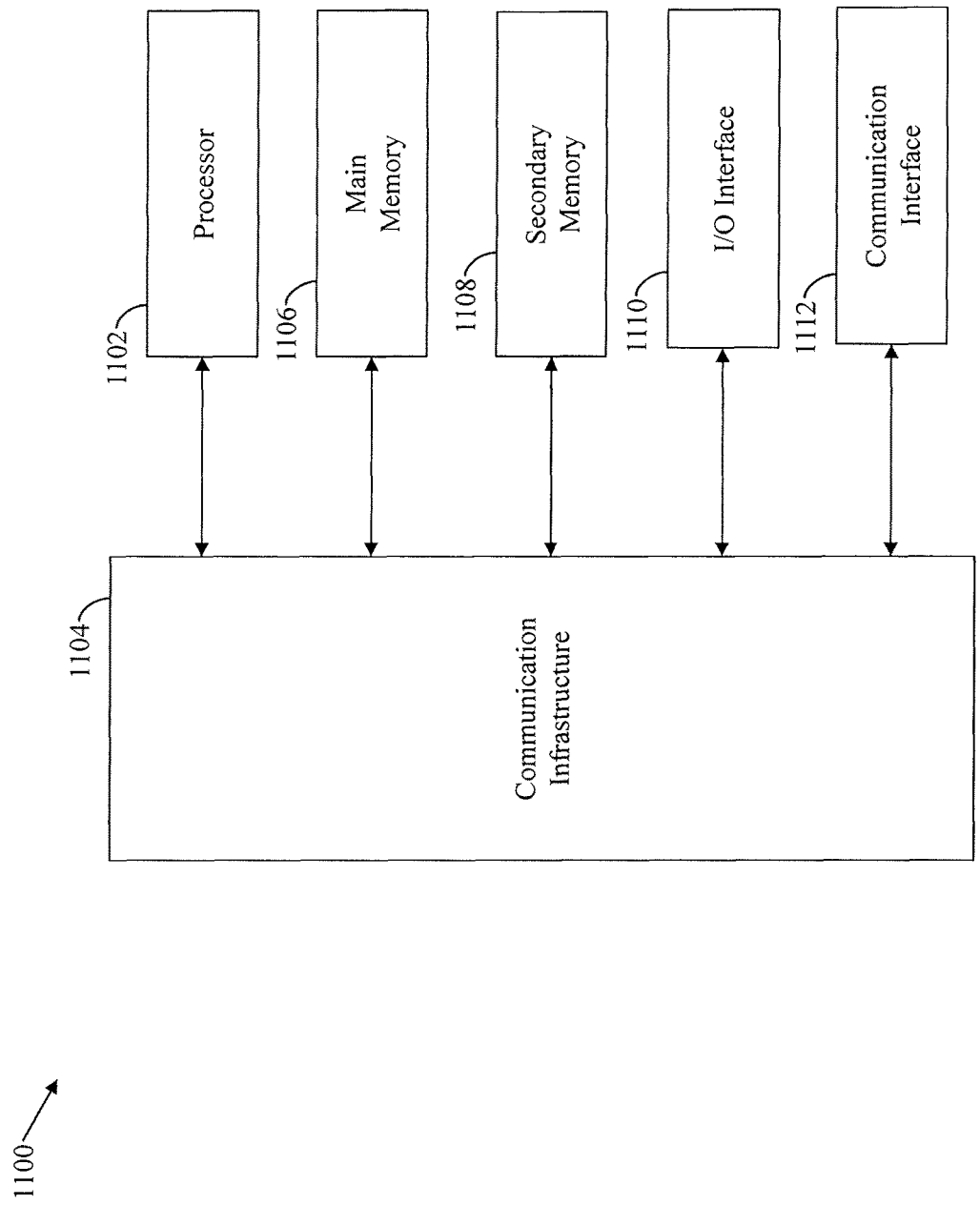
FIG. 11 is a block diagram that illustrates an architecture of a computer system, in accordance with an embodiment of the present disclosure.

FIG. 11 is a block diagram that illustrates an architecture of a computer system 1100, in accordance with an embodiment of the present disclosure. An embodiment of present disclosure, or portions thereof, may be implemented as computer readable code on the computer system 1100. In one example, the CS 112 or the first controller 206 may be implemented in the computer system 1100. Hardware, software, or any combination thereof may embody modules and components used to implement one or more operations of FIGS. 5A-5C and 8A-8C. The computer system 1100 includes a processor 1102 that may be connected to a communication infrastructure 1104. The computer system 1100 may further include a main memory 1106 and a secondary memory 1108. The computer system 1100 further includes an input/output (I/O) interface 1110 and a communication interface 1112. The communication interface 1112 may allow data transfer between the computer system 1100 and various devices that are communicatively coupled to the computer system 1100.

The first induction station 106a includes the first through third conveyors 402a-402c. For example, the first induction station 106a includes two feed conveyors and a buffer conveyor. By virtue of the two feed conveyors (e.g., the first and second conveyors 402a and 402b), the first induction station 106a is capable of conveying two packages (the first and second packages 702 and 704) of the first package type, simultaneously, or a single package (e.g., the third package) of the second package type. The first induction station 106a may be configured to handle a higher number of packages (both large and small packages), simultaneously, by increasing a number of feed conveyors (as shown in FIG. 10). Therefore, the solution provided by the disclosure is scalable. A scalable nature of the solution allows an organization or an entity (e.g., an organization or an entity associated with the storage facility 102) to design induction stations based on a current and/or an expected number of packages handled by the storage facility 102, allowing the organization to maximize a throughput of the storage facility 102 in a cost-effective manner. The disclosure describes using ultrasonic sensors (e.g., the first set of ultrasonic sensors 202) and light array sensors (e.g., the first set of light array sensors 204) for measuring dimensions of packages (e.g., the first through third packages), allowing the measurement of the dimensions of the packages in an accurate and cost effective manner. The dimensions of the packages are measured in real-time (when the packages are in motion), minimizing a time taken by each induction station to handle each package and maximizing a throughput of each induction station.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be executed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features an induction system for conveying packages in a storage facility. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the width or scope.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. An induction station for conveying one or more packages in a warehouse, the induction station comprising:
   first, second, and third conveyors, wherein the first and second conveyors are configured to convey the one or more packages from the first and second conveyors to the third conveyor, and wherein the first and second conveyors are in parallel;
a first set of sensors configured to measure a weight, a height, a length, and a width of each package;
a second set of sensors configured to detect a package type of each package as one of a first package type or a second package type, wherein the second set of sensors is installed in a first gap between the first and second conveyors; and
a controller configured to control a first speed of the first conveyor, a second speed of the second conveyor, and a third speed of the third conveyor for conveying the one or more packages, wherein the first speed, the second speed, and the third speed are controlled based on the detected package type of each package and at least one of the weight, height, length, width, and position of each package.

2. The induction station of claim 1, wherein each package of the first package type, when placed on one of the first and second conveyors, is within boundaries of a corresponding conveyor, and wherein each package of the second package type, when placed on the first and second conveyors, occupies first and second portions of the first and second conveyors.

3. The induction station of claim 1, wherein the first and second conveyors are configured to convey to the third conveyor:
a first package and a second package, respectively, of the one or more packages, when the package type of the first and second packages is the first package type, and wherein the first and second packages are conveyed simultaneously, or
a third package of the one or more packages, when the package type of the third package is the second package type.

4. The induction station of claim 3, wherein the controller is further configured to synchronize the first speed and the second speed based on the detection of the package type of the third package as the second package type.

5. The induction station of claim 1, wherein the controller is further configured to determine:
the height of each package based on first sensor data obtained from a first subset of sensors of the first set of sensors, wherein the height of each package is determined when each package is in motion on at least one of the first and second conveyors,
the length, width of each package, and a position of each package on at least one of the first and second conveyors, based on second sensor data obtained from a second subset of sensors of the first set of sensors, wherein the length, width, and position of each package is dynamically determined when each package is in motion on at least one of the first and second conveyors, and
the weight of each package based on third sensor data obtained from a third subset of sensors of the first set of sensors.

6. The induction station of claim 5, wherein the controller is further configured to determine a correction factor based on at least the position of each package, and wherein the height of each package is further determined based on the determined correction factor of each package.

7. The induction station of claim 5, wherein,
the first subset of sensors includes one or more ultrasonic sensors, wherein each ultrasonic sensor of the one or more ultrasonic sensors is installed above one of the first and second conveyors,
the second subset of sensors includes one or more light array sensors, wherein each light array sensor of the one or more light array sensors includes an emitter component and a receiver component, wherein one of the emitter and receiver components of each light array sensor is installed in a second gap between the first and second conveyors and the third conveyor, and wherein a remaining component of the emitter and receiver components of each light array sensor is installed above one of the first and second conveyors and is diametrically opposite to the one of the emitter and receiver components, and
the third subset of sensors includes one or more weight sensors, wherein each weight sensor of the one or more weight sensors is installed within one of the first and second conveyors.

8. The induction station of claim 7, wherein the controller is further configured to synchronize the third speed and at least one of the first speed and the second speed for conveying the one or more packages from the first and second conveyors, across the one or more light array sensors, to the third conveyor, at a constant speed.

9. The induction station of claim 1, further comprising one or more image-capturing sensors for scanning an identifier associated with each package,
wherein package details of each package are identified based on a corresponding scanned identifier.

10. The induction station of claim 9, wherein the controller is further configured to communicate, over a communication network, with a control server, wherein the control server selects one or more transport vehicles, from a set of transport vehicles, for transporting each package from the third conveyor to a first location associated with each package, wherein the one or more transport vehicles are selected based on the package details of each package and at least one of the weight, height, length, and width of each package, and wherein the first speed, the second speed, and the third speed are further controlled based on an estimated time of arrival of each of the one or more transport vehicles at a location of the induction station and a throughput requirement of the control server.

11. The induction station of claim 10, further comprising a display,
wherein the controller is further configured to render a user interface on a display, wherein the user interface presents, to an operator of the induction station, package information of the one or more packages, and wherein the package information includes at least one of the weight, height, length, width and package details of each of the one or more packages, and one or more errors or commands pertinent to the conveying of the one or more packages.

12. The induction station of claim 1, further comprising a third set of sensors for detecting a presence of an operator within a range of the induction station,
wherein at least one of the first and second conveyors is immobilized based on the detected presence of the operator.

13. A dimensioning system for an induction station in a warehouse, the dimensioning system comprising:
a first set of sensors configured to collect first sensor data for measuring a height of each package of one or more packages; and a second set of sensors configured to collect second sensor data for measuring a length and a width of each package,
wherein each package is placed on at least one of first and second conveyors of the induction station and is moving from at least one of the first and second conveyors to a third conveyor of the induction station, and
wherein a controller of the induction station determines the height of each package based on the first sensor data collected by the first set of sensors, and the length and width of each package based on the second sensor data collected by the second set of sensors.

14. The dimensioning system of claim 13, wherein the induction station includes a third set of sensors configured to detect a package type of each package as one of a first package type or a second package type, wherein the third set of sensors is installed in a first gap between the first and second conveyors, and wherein the first and second conveyors are in parallel.

15. The dimensioning system of claim 14, wherein the first and second conveyors are configured to simultaneously convey to the third conveyor:
a first package and a second package, respectively, of the one or more packages, when the package type of the first and second packages is the first package type, or
a third package of the one or more packages, when the package type of the third package is the second package type.

16. The dimensioning system of claim 13, wherein the controller determines a weight of each package based on fourth sensor data collected by a fourth set of sensors of the induction station, wherein the fourth set of sensors includes one or more weight sensors, and wherein each weight sensor of the one or more weight sensors is installed within one of the first and second conveyors.

17. The dimensioning system of claim 13, wherein,
the first set of sensors includes one or more ultrasonic sensors, and
the second set of sensors includes one or more light array sensors, and wherein,
each ultrasonic sensor of the one or more ultrasonic sensors is installed above one of the first and second conveyors, and
each light array sensor of the one or more light array sensors includes an emitter component and a receiver component, wherein one of the emitter and receiver components of each light array sensor is installed in a second gap between the first and second conveyors and the third conveyor, and wherein a remaining component of the emitter and receiver components of each light array sensor is installed above one of the first and second conveyors and is diametrically opposite to the one of the emitter and receiver components.

18. The dimensioning system of claim 13, wherein the controller controls a first speed of the first conveyor, a second speed of the second conveyor, and a third speed of the third conveyor for conveying the one or more packages, and wherein the first speed, the second speed, and the third speed are controlled based on a package type of each package and at least one of the height, the length, the width, and a weight of each package.

19. The dimensioning system of claim 18, wherein the controller communicates, over a communication network, with a control server, wherein the control server selects one or more transport vehicles, from a set of transport vehicles, for transporting each package from the third conveyor to a first location associated with each package, wherein the one or more transport vehicles are selected based on the height, the length, the width, a weight, and package details of each package, and wherein the first speed, the second speed, and the third speed are further controlled based on an estimated time of arrival of each of the one or more transport vehicles at a location of the induction station and a throughput requirement of the control server.

20. An induction station for conveying one or more packages in a storage facility, the induction station comprising:
a plurality of parallel feed conveyors and one or more buffer conveyors, wherein the plurality of parallel feed conveyors are used for conveying the one or more packages from the plurality of parallel feed conveyors to the one or more buffer conveyors, and wherein the plurality of parallel feed conveyors include at least first and second conveyors;
a first set of sensors for measuring a weight, a height, a length, and a width of each package;
a second set of sensors for detecting a package type of each package as one of a first package type or a second package type, wherein the second set of sensors is installed in a first gap between the first and second conveyors; and
a controller configured to control a speed of each of the plurality of parallel feed conveyors and the one or more buffer conveyors for conveying the one or more packages, wherein the speed of each of the plurality of parallel feed conveyors and the one or more buffer conveyors is controlled based on the detected package type of each package and at least one of the weight, height, length, and width of each package.

* * * * *